(12) United States Patent
Nakashima et al.

(10) Patent No.: US 9,199,610 B2
(45) Date of Patent: Dec. 1, 2015

(54) IN-VEHICLE DEVICE CONTROL SYSTEM

(75) Inventors: Kazuhiro Nakashima, Anjo (JP); Hiroko Murakami, Toyota (JP); Hiroki Okada, Toyota (JP); Arinobu Kimura, Toyota (JP)

(73) Assignees: DENSO CORPORATION, Kariya-shi, Aichi-pref. (JP); TOYOTA JIDOSHA KABUSHIKI KAISHA, Toyota, Aichi-pref. (JP)

( * ) Notice: Subject to any disclaimer, the term of this patent is extended or adjusted under 35 U.S.C. 154(b) by 482 days.

(21) Appl. No.: 13/145,837

(22) PCT Filed: Jan. 22, 2010

(86) PCT No.: PCT/JP2010/000348
§ 371 (c)(1),
(2), (4) Date: Aug. 25, 2011

(87) PCT Pub. No.: WO2010/084760
PCT Pub. Date: Jul. 29, 2010

(65) Prior Publication Data
US 2011/0298580 A1    Dec. 8, 2011

(30) Foreign Application Priority Data

Jan. 23, 2009    (JP) ................................. 2009-013455

(51) Int. Cl.
*G05B 23/02* (2006.01)
*B60R 25/24* (2013.01)
(Continued)

(52) U.S. Cl.
CPC ................. *B60R 25/24* (2013.01); *B60R 25/01* (2013.01); *B60R 25/33* (2013.01); *B60R 25/34* (2013.01); *E05B 49/00* (2013.01); *G05B 23/02* (2013.01); *H04M 11/00* (2013.01)

(58) Field of Classification Search
CPC ........ B60R 25/24; B60R 25/01; B60R 25/33; B60R 25/34; E05B 49/00; G05B 23/02; H04M 11/00

USPC .......................................................... 340/3.1
See application file for complete search history.

(56) References Cited

U.S. PATENT DOCUMENTS 6,476,517 B1 * 11/2002 Okada .......................... 307/10.2
7,205,884 B2 * 4/2007 Kumazaki et al. ........... 340/5.61
(Continued)

FOREIGN PATENT DOCUMENTS

| JP | 2003-138817 A | 5/2003 |
| JP | 2004-162521 A | 6/2004 |

(Continued)

OTHER PUBLICATIONS

International Search Report and Written Opinion of the ISA for PCT/JP2010/00348, ISA/JP, mailed Apr. 6, 2010.

*Primary Examiner* — Quang D Pham
(74) *Attorney, Agent, or Firm* — Harness, Dickey & Pierce, P.L.C.

(57) ABSTRACT

In an in-vehicle device control system, an in-vehicle device is controlled based on a checkup result of checkup operation, in which a checkup about a portable device is performed by mutual communication of transmitting a request signal from a vehicle-side unit mounted on a vehicle and transmitting in return a response signal from the portable device in response to the request signal. If the checkup is unsuccessful, the mutual communication is performed again by switching the communication frequency to perform the checkup again. When a user operates a door lock sensor, the vehicle-side unit performs an exterior checkup first. If the checkup is successful, a communication frequency, by which the checkup was performed successfully, is stored in a memory. The vehicle-side unit sets the communication frequency stored in the memory as a communication frequency, which is to be designated to the portable device, for performing an interior checkup next time.

19 Claims, 12 Drawing Sheets

(51) Int. Cl.
*H04M 11/00* (2006.01)
*B60R 25/34* (2013.01)
*B60R 25/33* (2013.01)
*E05B 49/00* (2006.01)
*B60R 25/01* (2013.01)

(56) References Cited

U.S. PATENT DOCUMENTS

| | | | |
|---|---|---|---|
| 8,138,894 B2* | 3/2012 | Kato et al. | 340/12.28 |
| 2003/0117295 A1* | 6/2003 | Okada | 340/825.72 |
| 2003/0224818 A1* | 12/2003 | Nagasaka et al. | 455/550.1 |
| 2004/0075532 A1* | 4/2004 | Ueda et al. | 340/5.72 |
| 2005/0232086 A1* | 10/2005 | Jiddou et al. | 368/47 |
| 2006/0017550 A1* | 1/2006 | Yoshida et al. | 340/426.11 |
| 2006/0258508 A1* | 11/2006 | Tanioka et al. | 477/203 |
| 2006/0260665 A1* | 11/2006 | Teshima et al. | 135/88.09 |
| 2006/0279401 A1* | 12/2006 | Yoshii et al. | 340/5.61 |
| 2007/0040649 A1* | 2/2007 | Dulgerian et al. | 340/5.64 |
| 2007/0132553 A1* | 6/2007 | Nakashima | 340/5.72 |
| 2008/0122595 A1* | 5/2008 | Yamamichi et al. | 340/426.16 |
| 2008/0169898 A1 | 7/2008 | Kato et al. | |
| 2008/0186131 A1* | 8/2008 | Hanai et al. | 340/5.2 |
| 2008/0186132 A1* | 8/2008 | Ikeo | 340/5.7 |
| 2008/0258868 A1* | 10/2008 | Nakajima et al. | 340/5.72 |
| 2009/0058597 A1* | 3/2009 | Shibagaki et al. | 340/5.72 |
| 2009/0066477 A1* | 3/2009 | Kaihori et al. | 340/5.72 |
| 2009/0091423 A1* | 4/2009 | Nagaoka et al. | 340/5.72 |
| 2009/0153294 A1* | 6/2009 | Katagiri et al. | 340/5.61 |
| 2009/0178448 A1* | 7/2009 | Tamezane et al. | 70/262 |
| 2009/0289759 A1* | 11/2009 | Tsuchiya et al. | 340/5.72 |
| 2010/0010698 A1* | 1/2010 | Iwashita et al. | 701/22 |
| 2010/0073153 A1* | 3/2010 | Yamaguchi et al. | 340/426.17 |
| 2010/0231369 A1* | 9/2010 | Oya | 340/426.11 |
| 2010/0235026 A1* | 9/2010 | Shimizu et al. | 701/22 |
| 2011/0057772 A1* | 3/2011 | Nagao et al. | 340/5.61 |
| 2011/0223868 A1* | 9/2011 | Kojima et al. | 455/67.11 |

FOREIGN PATENT DOCUMENTS

| | | |
|---|---|---|
| JP | 2008-174952 A | 7/2008 |
| JP | 2008-190173 A | 8/2008 |
| JP | 2008-202228 A | 9/2008 |

* cited by examiner

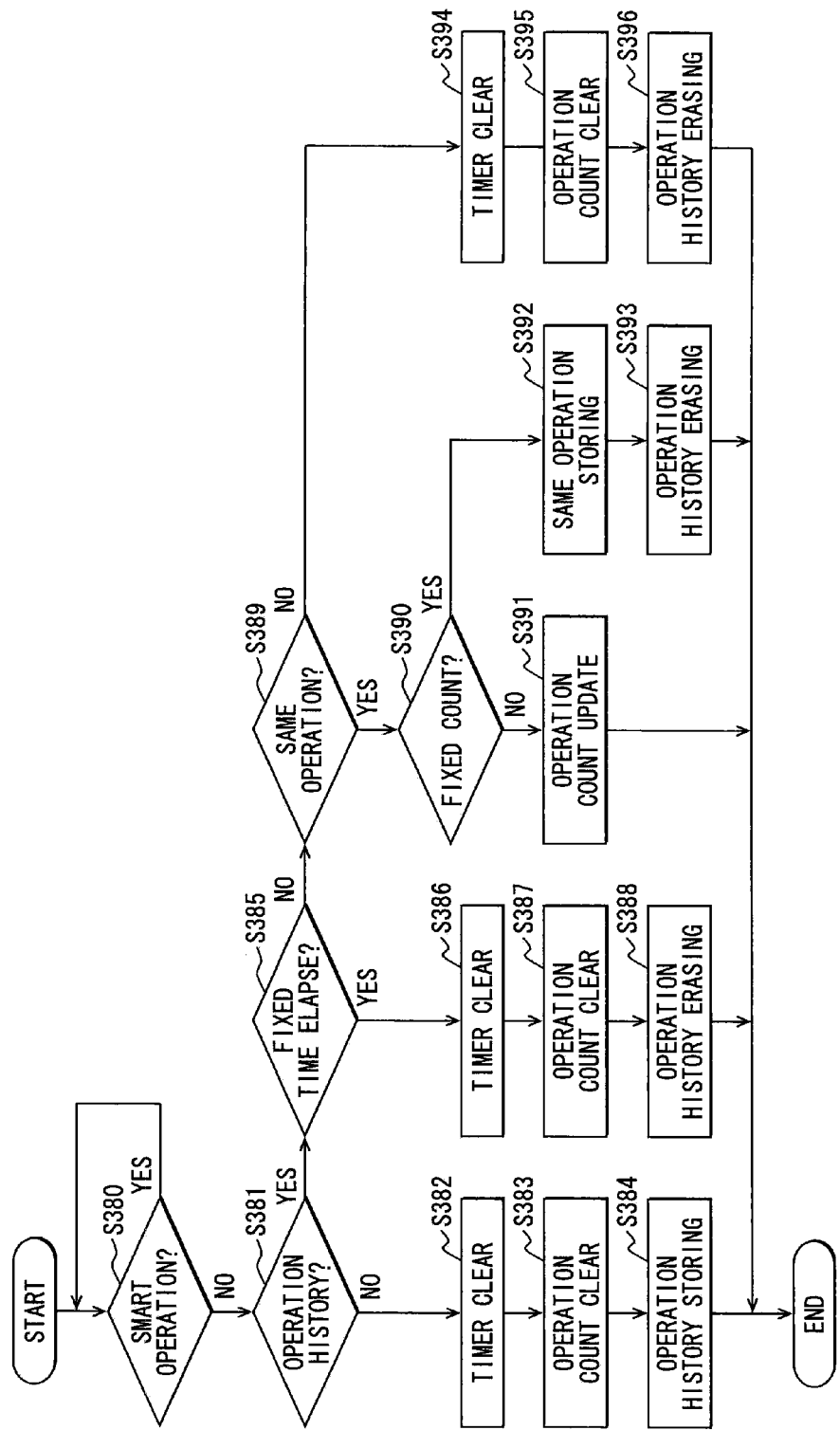

IN-VEHICLE DEVICE CONTROL SYSTEM

CROSS-REFERENCE TO RELATED APPLICATIONS

This application is a Section 371 national stage application of International Application No. PCT/JP2010/000348 filed on Jan. 22, 2010, which claims priority to Japanese Patent Application 2009-013455 filed on Jan. 23, 2009, the contents of which are incorporated herein by reference in their entirety.

TECHNICAL FIELD

The present invention relates to an in-vehicle device control system.

BACKGROUND ART

As one exemplary conventional in-vehicle device control system, a vehicular electronic key system (verification system) is disclosed in the following patent document 1. In this vehicular electronic key system, a control apparatus mounted in a vehicle performs checkup about a portable device carried by a user of the control apparatus by mutual radio communication, and controls the in-vehicle device based on a result of the checkup.

This vehicular electronic key system includes a smart security control apparatus mounted in a vehicle and a portable device carried by a user of the control apparatus. The smart security control apparatus transmits to the portable device a designation request signal, which designates a response frequency. When no radio signal is received within a predetermined allowable time period after transmission of the designation request signal, the smart security control apparatus transmits a designation request signal by changing the response frequency to a different frequency. The portable device selects the response frequency designated by the designation request signal and transmits to the smart security control apparatus a reception response signal of the selected response frequency. It is prevented that the response signal is not received because of jamming of the response signal. By thus making the radio communication to be less susceptible to influence of factors such as jamming, which disturbs radio communication, a control object can be operated normally.

However, in case of the system, which switches the communication frequency to perform the checkup again when the check result indicates an unsuccessful checkup, the frequency need be switched over until the check result indicates a successful checkup each time the checkup is performed even in a condition that the radio wave condition, in which the vehicle and the portable device are located, does not change. It is thus likely that the response characteristic is degraded due to an increase in the number of communications and time.

PRIOR ART DOCUMENT

Patent Document

Patent document 1: JP 2008-190173A

SUMMARY OF THE INVENTION

The present invention has an object of providing an in-vehicle device control system, which is capable of suppressing degradation of response characteristic while making a radio communication to be less susceptible to influence of factors such as jamming radio waves.

According to a first aspect of the present invention, an in-vehicle device control system comprises a portable device and a vehicle-side unit. The vehicle side unit is mounted on a vehicle for performing a checkup about the portable device by mutual communication, in which the vehicle-side unit transmits a request signal and the portable device returns a response signal in response to the request signal of the vehicle-side unit, thereby to control an in-vehicle device based on a checkup result, the vehicle-side unit switching a communication frequency to perform the mutual communication and the checkup again when the checkup result indicates an unsuccessful checkup. The portable device includes a portable device communication section for receiving the request signal transmitted from the vehicle-side unit and returning the response signal as the mutual communication with the vehicle-side unit. The response signal includes an ID code and is transmitted at a communication frequency designated by the vehicle-side unit. The vehicle-side unit includes a detection section, a frequency setting section, a vehicle-side communication section, a checkup section and a storing section, The detection section detects an operation of a user, by which the checkup is started. The frequency setting section sets the communication frequency to be designated to the portable device. The vehicle-side communication section transmits the request signal to the portable device and receives the response signal as the mutual communication with the portable device. The vehicle-side communication section transmits to the portable device frequency information indicating the communication frequency set by the frequency setting section. The checkup section checks the ID code and a registration code pre-registered. The ID code is included in the response signal transmitted from the portable device and received by the vehicle-side communication section. The storing section stores the communication frequency, which is used when the check result indicates a successful checkup. The frequency setting section is configured to switch over the communication frequency to be designated when the check result indicates the unsuccessful checkup. The frequency setting section is configured to perform a plurality of checkups for each user operation detected by the detection section, and set the communication frequency, which is stored in the storing section when a first checkup among the plurality of checkups performed by the checkup section is successful, as the communication frequency to be used in performing a next and subsequent checkups.

In case that the checkup is repeated a plurality of times each time the user operation is made, it is generally expected that the radio wave environment, in which the vehicle and the portable device are located, does not change so much. If the checkup is performed successfully once in a case of performing the checkup the plurality of times in response to each user operation, it is therefore highly possible to perform the mutual communication between the vehicle-side unit and the portable device by using the communication frequency, which resulted in the successful checkup, in the later checkup operations.

According to the in-vehicle device control system described above, it is possible to designate to the portable device only the communication frequency, which enabled the successful checkup for the first time, after the first checkup resulting in the successful checkup among the plurality of checkups in response to each of the user operation. Thus, the communication frequency (communication frequency used at the time of successful checkup), which is less susceptible to factors such as jamming radio waves, can be selected. As a result, it is not necessary to switch the communication frequency each time the checkup is performed and the degradation of the response characteristic is suppressed.

According to a second aspect of the present invention, an in-vehicle device control system comprises a portable device and a vehicle-side unit. The vehicle side unit is mounted on a vehicle for performing a checkup about the portable device by mutual communication, in which the vehicle-side unit transmits a request signal and the portable device returns a response signal in response to the request signal of the vehicle-side unit, thereby to control an in-vehicle device based on a checkup result, the vehicle-side unit switching a communication frequency to perform the mutual communication and the checkup again when the checkup result indicates an unsuccessful checkup. The portable device includes a portable device communication section for receiving the request signal transmitted from the vehicle-side unit and returning the response signal as the mutual communication with the vehicle-side unit. The response signal includes an ID code and is transmitted at a communication frequency designated by the vehicle-side unit. The vehicle-side unit includes a detection section, a frequency setting section, a vehicle-side communication section, a checkup section, a storing section and an estimation section. The detection section detects an operation of a user, by which the checkup is started. The frequency setting section sets the communication frequency to be designated to the portable device. The vehicle-side communication section transmits the request signal to the portable device and receives the response signal as the mutual communication with the portable device. The vehicle-side communication section transmits to the portable device frequency information indicating the communication frequency set by the frequency setting section. The checkup section checks the ID code and a registration code pre-registered. The ID code is included in the response signal transmitted from the portable device and received by the vehicle-side communication section. The storing section stores the communication frequency, which is used when the check result indicates a successful checkup. The estimation section estimates a change in a radio wave environment, in which the vehicle and the portable device are located, after the successful checkup by the checkup section. The frequency setting section is configured to switch over the communication frequency to be designated when the checkup result indicates the unsuccessful checkup. The frequency setting section is configured to fix a communication frequency to the communication frequency stored in the storing section in response to the successful checkup, when no change in the radio wave environment is estimated.

Thus, the communication frequency is fixed to the communication frequency, which was stored in the memory when the checkup resulted in OK, in case the radio wave environment will not change after the successful checkup. Thus, the communication frequency (communication frequency used at the time of successful checkup), which is less susceptible to factors such as jamming radio waves, can be selected. As a result, it is not necessary to switch the communication frequency each time the checkup is performed and the degradation of the response characteristic is suppressed.

BRIEF DESCRIPTION OF THE DRAWINGS

FIG. 18 is a flowchart showing storing processing and erasing processing of an operation history according to a second modified example of the fourth embodiment of the present invention.

PREFERRED EMBODIMENT OF THE INVENTION

Embodiments of the present invention will be described below with reference to the drawings.

First Embodiment

First, a first embodiment will be described.

Figure 1:
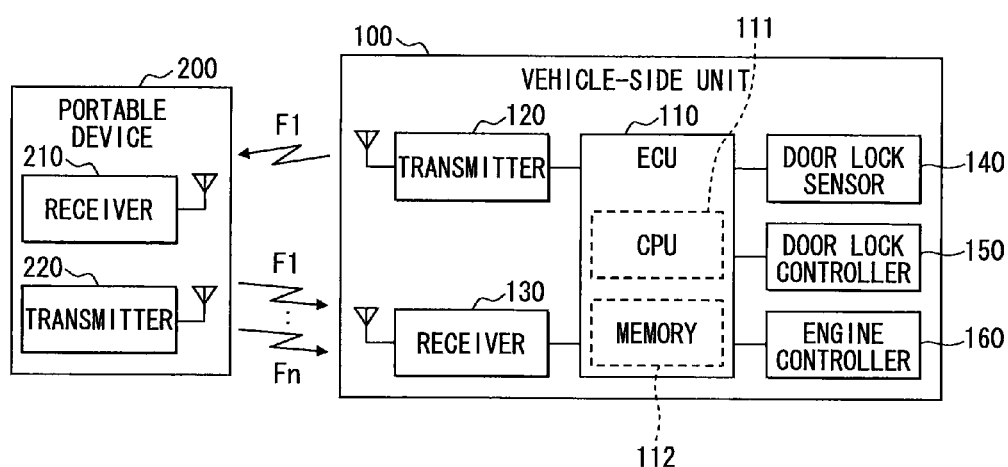
FIG. 1 is a block diagram showing an in-vehicle device control system according to an embodiment of the present invention.

As shown in FIG. 1, an in-vehicle device control system includes a vehicle-side unit 100 and a portable device 200. The in-vehicle device control system performs checkup about the portable device 200 by way of mutual communication (radio communication), in which the portable device 200 transmits a response signal in return to a request signal transmitted from the vehicle-side unit 100 mounted in a vehicle. The in-vehicle device control system controls an in-vehicle device (for example, a door lock mechanism, an engine start mechanism) based on a check result of the checkup operation. The in-vehicle device control system performs the checkup again by switching a communication frequency of the mutual communication in case the check result indicates an unsuccessful checkup.

The vehicle-side unit 100 is mounted in the vehicle. The vehicle-side unit 100 is provided to control functions of the vehicle-side unit 100 and includes an ECU (electronic control unit) 110, which is equipped with a CPU 111, a memory 112 and the like. In the vehicle-side unit 100, the ECU 110 is connected to a transmitter 120 (vehicle-side communication section), a receiver 130 (vehicle-side communication section), a door lock sensor (detection section) 140, a door lock controller 150 and an engine controller 160. The transmitter 120 is for transmitting a request signal (including frequency information) toward a predetermined detection area outside the vehicle. The receiver 130 is a tuner for receiving a response signal radio-transmitted from the portable device 200. The door lock controller 150 is for controlling and driving a door lock motor, which locks and unlocks a vehicle door. The engine controller 160 is for controlling starting of an engine mounted in the vehicle. The door lock sensor 140 may be a switch or a touch sensor, which is provided on or near an exterior handle of the vehicle door. The vehicle-side unit 100 may be provided with a speaker or the like, which outputs alarm.

The transmitter 120, the door lock sensor 140, the door lock controller 150, the door lock motor and the like are provided for each vehicle door. Although not shown, the vehicle-side unit 100 may further include, for each vehicle door, a lock state detection sensor for detecting lock/unlock state of a vehicle door and a door open detection sensor for detecting an open door.

The memory 112 of the ECU 110 stores an ID code, frequency information (for example, frequencies F1 to Fn) and the like. The ID code is for use in the checkup. The frequency information designates a plurality of communication frequencies, which are available in the radio communication from the portable device 200. The memory 112 (storing section) further stores a frequency (frequency information), by which the CPU 111 of the ECU 11 has performed the checkup successfully.

The CPU 111 of the ECU 110 outputs a control signal for commanding the transmitter 120 to transmit a request signal based on a signal from the door lock sensor 140. The CPU 111 (checkup section) also performs checkup of an ID code, which is included in the response signal from the portable device 200, and a pre-registered code based on a signal from the receiver 130 and outputs control signals to the door lock controller 150 and the engine controller 160. The CPU 111 of the ECU 110 switches over the communication frequency, which is designated to the portable device 200 in case of the unsuccessful check result. When a plurality of checkups is performed for each operation of a user on the door lock sensor 140, the CPU 111 sets the communication frequency, by which the first checkup among the plurality of checkups was performed successfully, as the frequency for the next and subsequent checkups (frequency setting section). Thus, the CPU 111 sets the communication frequency (frequency information), which is to be designated to the portable device 200. The processing operation of the ECU 110 (particularly CPU 111) will be described in detail later.

The transmitter 120 transmits predetermined data by FM modulation or AM modulation of a radio wave, which has a carrier wave of a LF (low frequency) band (for example, about 134 KHz). The receiver 130 is configured to be capable of receiving a radio wave in a predetermined range, for example, UHF (ultra high frequency) band. The receiver 130 has a tuning function for receiving a radio wave of a predetermined frequency with high receiver sensitivity. The receiver 130 receives the response signal by tuning the reception frequency to the communication frequency transmitted from the portable device 200, when the portable device 200 outputs the response signal at the designated communication frequency in the door lock control described later.

The portable device 200 includes a microcomputer (not shown), a receiver section (portable device communication section) 210 and a transmitter section (portable device communication section) 220. The microcomputer controls functions of the portable device 200. The receiver section 210 is for mutual communication with the vehicle-side unit 100 and receives the request signal transmitted from the transmitter 7 by a receiver antenna so that data included in the request signal is inputted to the microcomputer. The transmitter section 220 transmits (returns) through a transmitter antenna the response signal including the data, which is outputted from the microcomputer. The portable device 200 stores an ID code, which identifies the portable device itself.

The transmitter section 220 selects the designated communication frequency among the plurality of communication frequencies for transmitting the response signal and transmits the predetermined data by FM modulation or AM modulation of the radio wave having the carrier wave of the selected communication frequency. When the portable device 200 receives the frequency information indicating the designated communication frequency transmitted from the vehicle-side unit 100, the portable device 200 transmits the response signal to the vehicle-side unit 100 at the communication frequency corresponding to the frequency information. As the communication frequency selectable by the transmitter section 220, radio waves within a range of UHF band, for example, 300 to 400 MHz, is set. The plurality of frequency information (for example, frequency F1 to frequency Fn) is set within this range.

In the in-vehicle device control system, the radio wave in the UHF band, which the portable device 200 uses for transmission, is more susceptible to noise (jamming noise) generated by communication cables, large-scale display devices and the like than the radio wave in the LF band used by the vehicle-side unit 100. Thus, jamming (that is, communication abnormality) is likely to occur.

Figure 2:
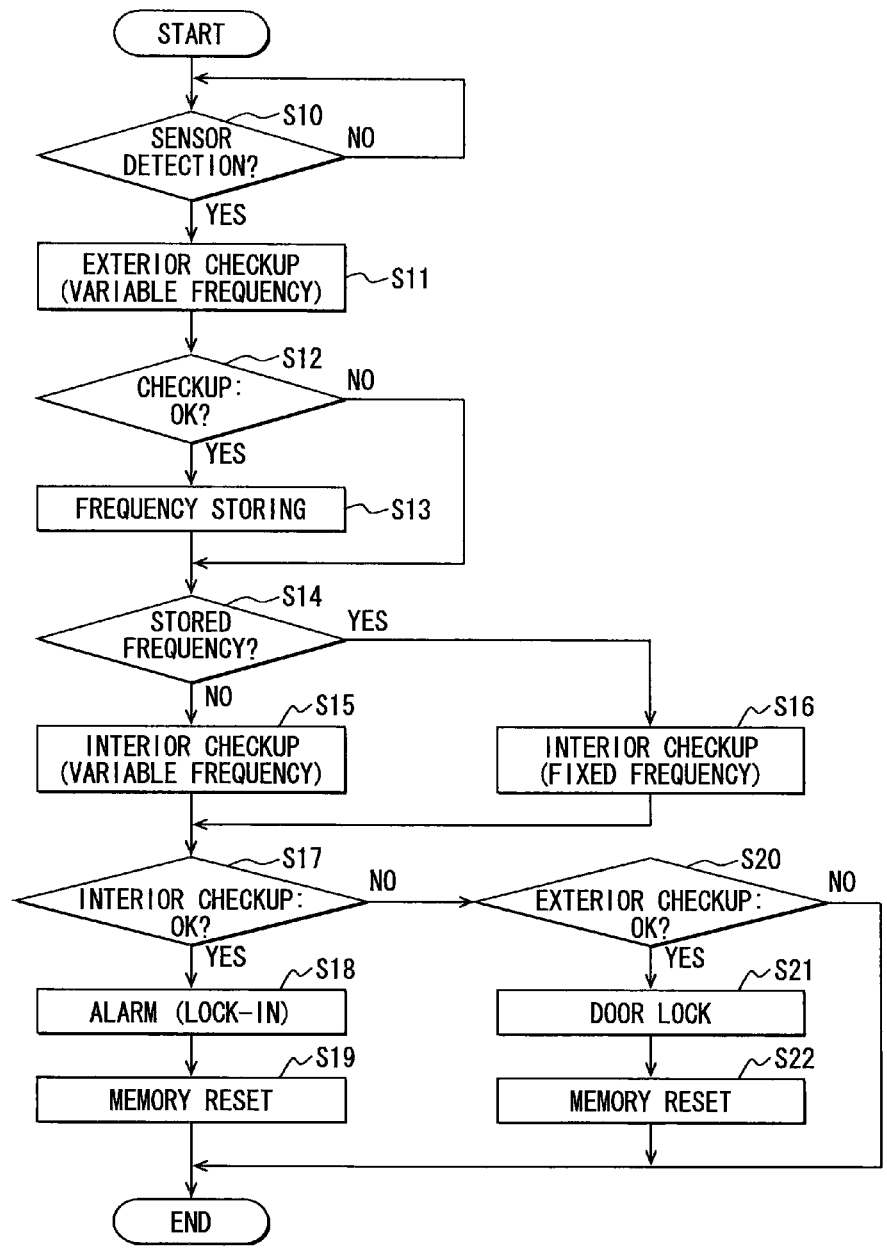
FIG. 2 is a flowchart showing a processing operation of the in-vehicle device control system according to a first embodiment of the present invention.

The in-vehicle device control system is therefore configured to reduce susceptibility of the response signal of the portable device 200 to influence of jamming noise and degradation of response characteristic of the same, when the checkup is repeated a plurality of times in response to each user operation. A processing operation of this in-vehicle device control system will be described with reference to FIG. 2, which is a flowchart showing a processing operation of the in-vehicle device control system according to the first embodiment of the present invention. Here, an example in a door lock operation will be described. The processing in the flowchart of FIG. 2 is started, for example, when all of the vehicle doors are closed.

At step S10, the CPU 111 checks whether a sensor detection by the door lock sensor 140 is present. That is, based on a detection result of the door lock sensor 140, the CPU 111 checks whether the user has operated the door lock sensor 140 to input a vehicle door lock command. It is thus checked whether the user has operated the door lock sensor 140 to start a checkup for locking the door. If the check result indicates the sensor detection (that is, the user has operated the door lock sensor 140), step S11 is executed. If the check result indicates no sensor detection (that is, the user has not operated the door lock sensor 140), the CPU 140 repeats the checkup operation of step S10.

At step S11, the CPU 111 (checkup section) executes an exterior checkup to check whether the portable device 200 is present outside the vehicle by variable frequency, that is, by varying the frequency. The CPU 111 (frequency setting section) is thus for executing the exterior checkup by switching the communication frequency, which is to be designated to the portable device 200, if the vehicle-side unit 100 determines a checkup NG (unsuccessful checkup). That is, this processing is the exterior checkup for checking the portable device 200 by switching the communication frequency when the portable device 200 transmits the response signal.

The CPU 111 therefore transmits the request signal including frequency information, which indicates a frequency to be designated to the portable device 200. The portable device 200 transmits the response signal to the vehicle-side unit 100 by the designated communication frequency in case of transmitting the response signal in response to the request signal.

The checkup NG indicates that the checkup is unsuccessful. The checkup NG is determined, when no response signal was received within a predetermined fixed time from transmission of the request signal or when an ID code included in a received response signal is not in a predetermined correspondence relation (for example, agreement) with an ID code stored in the memory 112 of the ECU 110. A checkup OK indicates that the checkup is successful. The checkup OK is determined, when the response signal was received within the predetermined time from transmission of the request signal or when the ID code included in the received response signal is in the predetermined correspondence relation (for example, agreement) with the ID code stored in the memory 112 of the ECU 110.

At step S12, the CPU 111 checks whether the check result is OK or not. That is, it is checked whether the ID code included in the received response signal is in the predetermined correspondence relation (for example, agreement) with the ID code stored in the memory 112. The CPU 111 executes step S13, if the check result indicates the checkup OK. The CPU 111 executes step S14, if the check result indicates the checkup NG even when all the frequency information was transmitted to the portable device 200 (that is, even when all the communication frequencies, which can be usable by the portable device 200, was designated).

At step S13, the CPU 111 stores in the memory 112 (storing section) the communication frequency of the response signal, which the portable device 200 transmitted and resulted in the checkup OK, that is, the communication frequency (frequency information) having been designated to the portable device 200. That is, the communication frequency at this time is the communication frequency, by which the checkup was successfully performed for the first time among a plurality of checkups performed in response to each user operation detected by the door lock sensor 140. The communication frequency is stored so that the communication frequency, which enabled the first checkup to be successful among the plurality of checkups performed in response to each user operation detected by the door lock sensor 140, may be used as a communication frequency for performing next and subsequent checkups.

At step S14, the CPU 111 checks whether the communication frequency (communication frequency), which is to be designated to the portable device 200, is stored in the memory 112. That is, it is checked whether the communication frequency, by which the exterior checkup at step S11 resulted in the checkup OK, is stored. If the check result indicates absence of stored frequency, step S15 is executed. If the check result indicates presence of the stored frequency, step S16 is executed.

At step S15, the CPU 111 (checkup section) performs an interior checkup by varying the frequency to check whether the portable device 200 is located in the vehicle compartment. This step is for performing the interior checkup by switching the communication frequency designated to the portable device 200, when the checkup NG is determined in the vehicle-side unit 100. That is, the interior checkup is performed by changing the communication frequency, at which the portable device 200 transmits the response signal. The CPU 111 thus transmits to the portable device 200 the request signal including the frequency information indicating the communication frequency, which is designated to the portable device 200. When the portable device 200 transmits the response signal in response to the request signal, the portable device 200 transmits the response signal by the communication frequency designated by the vehicle-side unit 100.

At S16, the CPU 111 (checkup section) performs an interior checkup by a fixed frequency to check whether the portable device 200 is in the vehicle compartment. This is for performing the interior checkup (frequency setting section) by designating the communication frequency (frequency information), which is stored in the memory 112 at step S13. This communication frequency, which is designated to the portable device 200, is a communication frequency, by which the first checkup among the plurality of checkups in response to each user operation. The CPU 111 thus transmits to the portable device 200 the request signal including the frequency information, which is stored in the memory 112 at S13 and indicates the frequency communication to be designated to the portable device 200. The portable device 200 transmits the response signal by the communication frequency designated by the vehicle-side unit 100, when the portable device 200 transmits the response signal in response to the request signal.

At S17, the CPU 111 checks whether the check result is OK. That is, it checks whether the ID code included in the received response signal is in the predetermined correspondence relation (for example, agreement) with the ID code stored in the memory 112. If the check result is OK, the CPU 111 executes step S18. If the check result is NG even when all the frequency information was transmitted to the portable device 200 (even when all the communication frequencies usable by the portable device 200 were designated), the CPU 111 executes step S20.

At step S18, the CPU 111 outputs an alarm, which indicates that the portable device 200 is locked in the vehicle compartment, by outputting sound from a speaker for example.

At step S19, the CPU 111 (reset section) rests the memory 112. Resetting the memory 112 is erasure of the communication frequency, which was stored when the check resulted in the successful checkup for the first time. Thus, the communication frequency (frequency information), which was stored in the memory 112 when the check resulted in the successful checkup for the first time among the plurality of checkups performed in response to each user operation detected by the door lock sensor 140.

When the plurality of checkups was finished for each user operation, it is highly likely that the radio wave environment, in which the portable device 200 is located, is varying. Therefore, as executed at step S19, it is preferred to erase the communication frequency, which was stored in the memory 112 when the first checkup was performed successfully, when the checkups (both the exterior checkups and the interior checkups) were finished the plurality of times in response to each user operation detected by the door lock sensor 140.

At step S20, the CPU 111 checks whether the check result is OK. That is, the CPU 111 checks whether the ID code included in the received response signal is in the predetermined correspondence relation (for example, agreement) with the ID code stored in the memory 112. If the check result is OK, the CPU 111 executes step S21. If the check result is NG even when all the frequency information was transmitted to the portable device 200 (all the communication frequencies usable by the portable device 200 were designated), the processing is finished.

At step S21, the CPU 111 outputs to the door lock controller 150 a control signal indicating a locking of a vehicle door so that the vehicle doors are locked.

At step S22, the CPU 111 (reset section) resets the memory 112. Resetting the memory 112 is erasure of the communication frequency, which was stored when the check resulted in the successful checkup for the first time. Thus, the communication frequency (frequency information), which was stored in the memory 112 when the check resulted in the successful checkup for the first time among the plurality of checkups performed in response to each user operation detected by the door lock sensor 140.

It is likely that the radio wave environment, in which the vehicle and the portable device 200 are located, will vary, when the checkup is finished the plurality of times relative to one operation of the user. It is therefore preferred to erase the communication frequency stored in the memory 112, by which the checkup was performed successfully for the first time in a case of the plurality of checkups for each user operation detected by the door lock sensor 140 (in this case, exterior checkup and interior checkup), as performed at step S19.

In case that the checkup is repeated a plurality of times (in this case, exterior checkup and interior checkup) each time the user operation is detected by the door lock sensor 140, it is generally expected that the radio wave environment, in which the vehicle and the portable device 200 are located, does not change so much. If the checkup is performed successfully once in a case of performing the checkup the plurality of times in response to each user operation, it is therefore highly possible to perform the mutual communication between the vehicle-side unit 100 and the portable device 200 by using the communication frequency, which resulted in the successful checkup, in the later checkup operations.

According to the in-vehicle device control system in the present embodiment, it is possible to designate to the portable device 200 only the communication frequency, which enabled the successful checkup for the first time, after the first checkup (in this example, exterior checkup) resulting in the successful checkup among the plurality of checkups (in this example, exterior checkup and interior checkup) in response to each of the user operation. That is, in performing subsequent checkups (in this example, interior checkup), the portable device 200 performs communication with the unit 110 by using the communication frequency, which enabled the first successful checkup. Thus, the communication frequency (communication frequency used at the time of successful checkup), which is less susceptible to factors such as jamming radio waves, can be selected. As a result, it is not necessary to switch the communication frequency each time the checkup is performed and the degradation of the response characteristic is suppressed.

Second Embodiment

A second embodiment will be described next.

The present embodiment is different from the first embodiment in that an estimation section is provided to estimate a change in the radio wave environment, in which the vehicle and the portable device 200 are located. Further, the vehicle-side unit 100 is provided with a timer according to the present embodiment.

First, communication frequency storing processing and communication frequency erasing processing in the in-vehicle device control system according to the present embodiment are described with reference to FIG. 4 and FIG. 5.

The communication frequency storing processing will be described first with reference to FIG. 4.

At step S130, the CPU 111 checks whether the check result of the exterior checkup or the interior checkup is OK. That is, it is checked whether the ID code included in the received response signal and the ID code stored in the memory 112 are in the predetermined correspondence relation (for example, agreement). If the check result is OK, the CPU 111 executes step S131. If the check result is NG even when all the frequency information was transmitted (even when all the communication frequencies usable by the portable device 200 were designated) to the portable device 200, the CPU 111 finishes the frequency storing processing.

At step S131, the CPU 111 stores in the memory 112 (storing section) the communication frequency of the response signal, which the portable device 200 transmitted and resulted in the checkup OK, that is, the communication frequency (frequency information) designated to the portable device 200. Storing the communication frequency is for using it as the communication frequency as long as the radio wave environment, in which the vehicle and the portable device 200 operated and the check resulted in OK, does not change. At step S132, the CPU 111 clears a timer.

The communication frequency storing processing will be described next with reference to FIG. 5.

At step S140, the CPU 111 checks whether a fixed time has elapsed after the timer (time measuring section) was cleared (that is, after storing of the communication frequency as a result of checkup OK). This fixed time is set to a time interval, in which the radio wave environment will not change. If it is determined that the fixed time has elapsed, the CPU 111 executes step S141 to erase the communication frequency, which was stored in the memory 111 in the storing processing. If it is determined that the fixed time has not elapsed yet, the checkup at step S140 is repeated. If it is within the fixed time after the successful checkup, the CPU 111 (estimation section) estimates that no radio environment arose in the radio wave environment. During this interval, the communication frequency stored in the memory 112 as a result of the checkup OK is not erased. It is thus possible to check (estimation section) whether the radio wave environment has changed based on whether it is still within the fixed time from the successful checkup.

Figure 3:
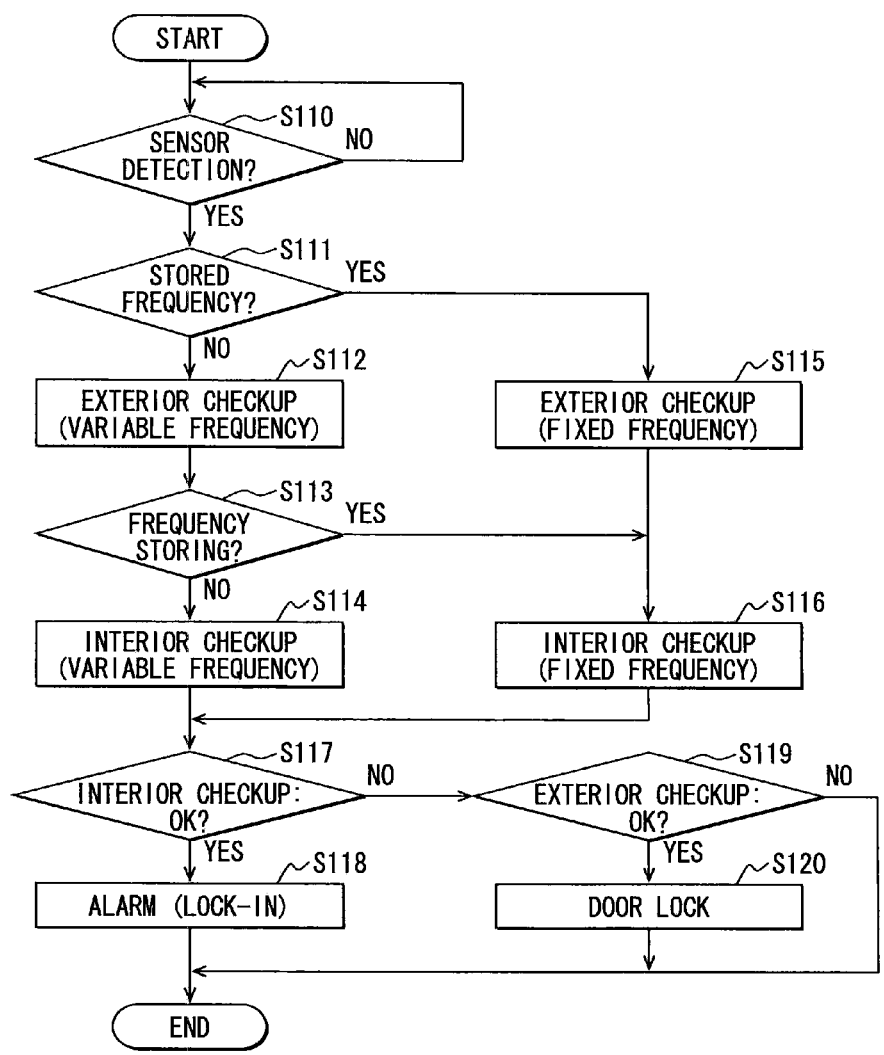
FIG. 3 is a flowchart showing a processing operation of an in-vehicle device control system according to a second embodiment of the present invention.

The processing operation of the in-vehicle device control system according to the present embodiment shown in FIG. 3 will be described next.

At step S110, similarly to step S10 in FIG. 2, the CPU 111 checks whether the sensor detection is present. If the check result indicates the sensor detection, step S111 is executed. If the check result indicates no sensor detection, the CPU 111 repeats the checkup of step S110.

At step S111, the CPU 111 checks whether the communication frequency (communication information), which is to be designated to the portable device 200, is stored in the memory 112. That is, it is checked whether the communication frequency, by which the check resulted in the checkup OK within the fixed time in the storing processing, is stored in the memory 112. That is, the communication frequency, which is less susceptible to communication impeding factors such as jamming radio noises, is stored in the memory 112. If the check result indicates absence of stored frequency, step S112 is executed. If the check result indicates presence of the stored frequency, step S115 is executed.

At step S112, similarly to step S11 in FIG. 2, the CPU 111 (checkup section) performs the interior checkup by varying the frequency to check whether the portable device 200 is located in the vehicle compartment.

At step S113, similarly to step S111, the CPU 111 performs whether the communication frequency (communication information), which is to be designated to the portable device 200, is stored in the memory 112. If the check result indicates absence of the stored frequency, step S114 is executed. If the check result indicates presence of the stored frequency, step S116 is executed.

At step S114, similarly to step S15 in FIG. 2, the CPU 111 (checkup section) performs the interior checkup by varying the frequency to check whether the portable device 200 is present in the vehicle compartment.

At step S115, the CPU 111 (checkup section) performs the exterior checkup by the fixed frequency to check whether the portable device 200 is located outside the vehicle compartment. This is for performing the exterior checkup (frequency setting section) by designating the communication frequency (frequency information), which is stored in the memory 112 in the storing processing (step S131 in FIG. 4). This communication frequency, which is designated to the portable device 200, is the communication frequency, by which the check resulted in OK within the fixed time. This communication frequency is less susceptible to the communication impeding factors such as jamming radio waves.

Figure 4:
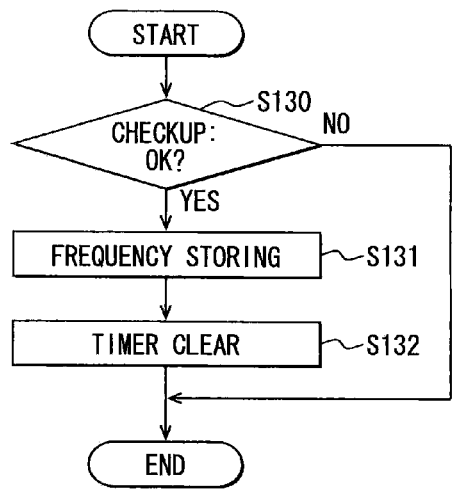
FIG. 4 is a flowchart showing frequency storing processing of the in-vehicle device control system according to the second embodiment of the present invention.
Figure 5:
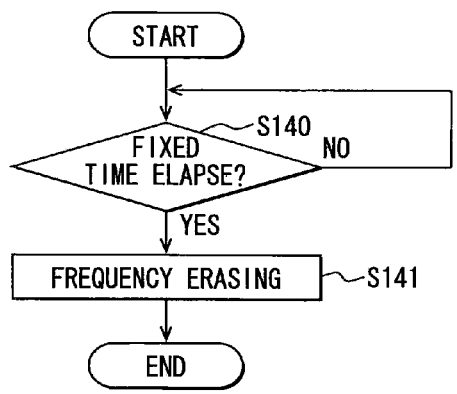
FIG. 5 is a flowchart showing frequency erasing processing of the in-vehicle device control system according to the second embodiment of the present invention.

Accordingly, the CPU 111 transmits to the portable device 200 the request signal including the frequency information, which is stored in the memory 112 at step S131 in FIG. 4 and indicates the communication frequency to be designated to the portable device 200. When the portable device 200 transmits the response signal in response to the request signal, the portable device 200 transmits the response signal by the communication frequency designated by the vehicle-side unit 100.

At step S116, the CPU 111 (checkup section) performs the interior checkup by using the fixed frequency to check whether the portable device 200 is inside the vehicle compartment. This processing (frequency setting section) is for performing the interior checkup by designating the communication frequency (frequency information), which is stored in the memory 112 in the storing processing (step S131 in FIG. 4), to the portable device 200. This communication frequency designated to the portable device 200 is the communication frequency, by which the checkup OK is produced within the fixed time. That is, this communication frequency is less susceptible to influence of factors such as jamming radio noises, which will impede the radio communication.

Accordingly, the CPU 111 transmits to the portable device 200 the request signal including the frequency information, which indicates the communication frequency designated to the portable device 200. When the portable device 200 transmits the response signal in response to the request signal, the portable device 200 transmits the response signal by the communication frequency designated by the vehicle-side unit 100.

Steps S117 to S120 are the same as steps S17, S18, S20 and S21 and hence the same description is not repeated.

Thus, the communication frequency for the portable device 200 is fixed to the communication frequency, which was stored in the memory 112 when the check resulted in OK, for the fixed time after the successful checkup. Thus, the communication frequency (communication frequency used at the time of successful checkup), which is less susceptible to factors such as jamming radio waves, can be selected. As a result, it is not necessary to switch the communication frequency each time the checkup is performed and the degradation of the response characteristic is suppressed.

First Modified Example

It is less likely that the radio wave environment, in which the vehicle and the portable device 200 are located, will change during a time interval from the determination of the successful checkup to opening of the vehicle door. As a first modified example of the second embodiment, it is possible to estimate a change in the radio wave environment based on whether the door is opened after the determination of the successful checkup. The vehicle-side unit 100 according to the present embodiment is assumed to have a door-opening detection sensor (door-opening detection section), which detects opening of the door. This first modified example is different from the second embodiment in the frequency storing processing and the frequency erasing processing. That is, the basic processing operation of the in-vehicle device control system other than the frequency storing processing and the frequency erasing processing is similar to the second embodiment (FIG. 3).

Figure 7:
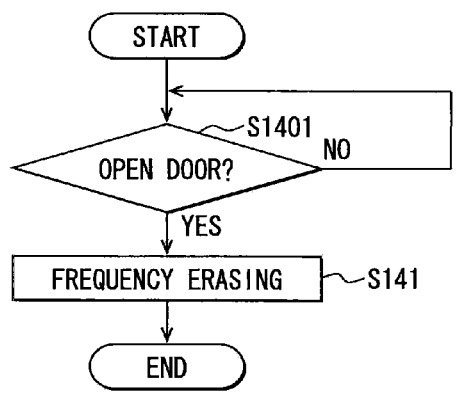
FIG. 7 is a flowchart showing frequency erasing processing of the first modified example of the second embodiment of the present invention.

First, the storing processing of the communication frequency in the first modified example will be described. This storing processing of the communication frequency corresponds to the storing processing shown in FIG. 4, except that step S132 is omitted. This storing processing of the communication frequency according to the first modified example, is similar to those of a second to a fourth modified examples, which will be described later. The erasing processing of the communication frequency according to the first modified example shown in FIG. 7 will be described next.

At step S1401, the CPU 111 checks whether the vehicle door is open (open door) after the determination of the successful checkup (that is, storing of the communication frequency) based on the detection result of the door-opening detection sensor. If it is determined that the door is open, step S141 is executed. At S141, the CPU 111 erases the communication frequency, which was stored in the memory 112 in the storing processing. If it is determined that the door is not open, step S1401 is repeated. The radio wave environment will be estimated to remain the same during a period from the determination of the successful checkup to the open door (opening of the vehicle door). For this reason, the communication frequency stored in the memory 112 at the time of determination of checkup OK is not erased during this period. It is thus possible to estimate (estimation section) a change in the radio wave environment based on whether the vehicle door is opened after the determination of the successful checkup.

Second Modified Example

It is also less likely that the radio wave environment, in which the vehicle and the portable device 200 are located, will change during a time interval from the determination of the successful checkup to turning-on of an ignition switch (IG) or an accessory switch (ACC) of the vehicle. As a second modified example of the second embodiment, it is possible to estimate a change in the radio wave environment based on whether the IG or the ACC of the vehicle is turned on after the determination of the successful checkup.

Figure 6:
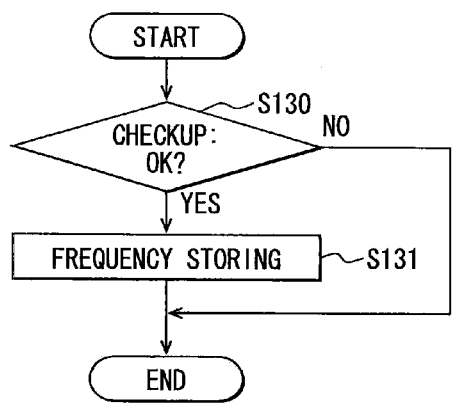
FIG. 6 is a flowchart showing frequency storing processing of a first to fourth modified embodiments of the second embodiment of the present invention.

The vehicle-side unit 100 according to the present embodiment is assumed to have an ignition sensor, which detects an on/off-state of the IG or ACC of the vehicle. This second modified example is different from the second embodiment and the first modified example is in the frequency erasing processing. That is, the basic processing operation and the storing processing of the in-vehicle device control system other than the frequency erasing processing are similar to the second embodiment (FIG. 3) and the first modified example (FIG. 6).

Figure 8:
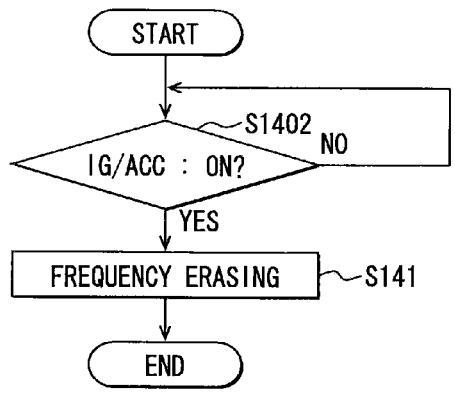
FIG. 8 is a flowchart showing frequency erasing processing of the second modified example of the second embodiment of the present invention.

First, the erasing processing of the communication frequency in the second modified example will be described with reference to FIG. 8.

At step S1402, the CPU 111 checks whether the IG or ACC of the vehicle is in the on-state after the determination of the successful checkup (that is, storing of the communication frequency) based on the detection result of the ignition sensor. If it is determined that the IG or ACC of the vehicle is in the on-state, step S141 is executed. At S141, the CPU 111 erases the communication frequency, which was stored in the memory 112 in the storing processing. If it is determined that the IG or ACC of the vehicle door is not in the on-state, step S1402 is repeated. It is estimated that the radio wave environment will not change in the time interval from the determination of the successful checkup to the turning-on of the IG or ACC of the vehicle. For this reason, the communication frequency stored in the memory 112 at the time of determination of checkup OK is not erased during this period. It is thus possible to estimate (estimation section) a change in the radio wave environment based on whether the IG or ACC is turned on after the determination of the successful checkup.

Third Modified Example

It is also less likely that the radio wave environment, in which the vehicle and the portable device 200 are located, will change during a time interval from the determination of the successful checkup to turning-on of an engine. As a third modified example of the second embodiment, it is possible to estimate a change in the radio wave environment based on whether the engine is started after the determination of the successful checkup.

The vehicle-side unit 100 according to the present embodiment is assumed to have a start sensor, which detects a start of the engine of the vehicle. This third modified example is different from the second modified example, the second embodiment and the first modified example in the frequency erasing processing. That is, the basic processing operation and the storing processing of the in-vehicle device control system other than the frequency erasing processing are similar to the second embodiment (FIG. 3) and the first modified example (FIG. 6).

Figure 9:
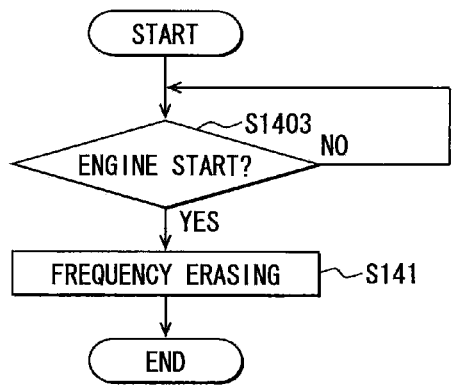
FIG. 9 is a flowchart showing frequency erasing processing of the third modified example of the second embodiment of the present invention.

The erasing processing of the communication frequency in the third modified example will be described with reference to FIG. 9. At step S1403, the CPU 111 checks whether the engine is started after the determination of the successful checkup (that is, storing of the communication frequency) based on the detection result of the start sensor. If it is determined that the engine of the vehicle is started, step S141 is executed. At S141, the CPU 111 erases the communication frequency, which was stored in the memory 112 in the storing processing. If it is determined that the engine of the vehicle is not started, step S1402 is repeated. The radio wave environment will be estimated to remain the same during a period from the determination of the successful checkup to the start of the engine of the vehicle. For this reason, the communication frequency stored in the memory 112 at the time of determination of checkup OK is not erased during this period. It is thus possible to estimate (estimation section) a change in the radio wave environment based on whether the engine of the vehicle is started after the determination of the successful checkup.

Fourth Modified Example

It is also less likely that the radio wave environment, in which the vehicle and the portable device 200 are located, will change during a time interval from the determination of the successful checkup to detection of vehicle travel (vehicle travel speed). As a fourth modified example of the second embodiment, it is possible to estimate a change in the radio wave environment based on whether the vehicle started traveling after the determination of the successful checkup.

The vehicle-side unit 100 according to the present embodiment is assumed to have a travel speed sensor, which detects travel of the vehicle. This fourth modified example is different from the second modified example, the second embodiment and the first modified example in the frequency erasing processing. That is, the basic processing operation and the storing processing of the in-vehicle device control system other than the frequency erasing processing are similar to the second embodiment (FIG. 3) and the first modified example (FIG. 6).

Figure 10:
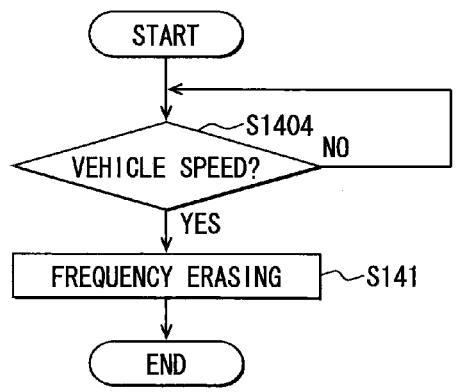
FIG. 10 is a flowchart showing frequency erasing processing of the fourth modified example of the second embodiment of the present invention.

The erasing processing of the communication frequency in the fourth modified example will be described with reference to FIG. 10.

At step S1404, the CPU 111 checks whether the vehicle travel speed indicating travel of the vehicle is detected after the determination of the successful checkup (that is, storing of the communication frequency) based on the detection result of the vehicle travel speed sensor. If it is determined that the vehicle travel speed of the vehicle is detected, step S141 is executed. At S141, the CPU 111 erases the communication frequency, which was stored in the memory 112 in the storing processing. If it is determined that the vehicle travel speed of the vehicle is not detected, step S1404 is repeated. The radio wave environment will be estimated to remain the same during a period from the determination of the successful checkup to the detection of the vehicle travel speed of the vehicle. For this reason, the communication frequency stored in the memory 112 at the time of determination of the checkup OK is not erased during this period. It is thus possible to estimate (estimation section) a change in the radio wave environment based on whether the vehicle travel speed of the vehicle is detected after the determination of the successful checkup.

Third Embodiment

Next, a third embodiment will be described with reference to FIGS. 11 and 12.

The same configuration as the first embodiment will not be described. The present embodiment is different from the first embodiment in that an estimation section is provided to estimate a change in the radio wave environment, in which the vehicle and the portable device 200 are located, after a checkup is performed successfully based on a location of the vehicle.

Further, the vehicle-side unit 100 according to the present embodiment is provided with a location detection device such as a GPS, which detects the present location of the vehicle.

First, the communication frequency storing processing in the in-vehicle device control system according to the present embodiment is described with reference to FIG. 12.

At step S230, the CPU 111 checks whether the check result of the exterior checkup or the interior checkup is OK. That is, it is checked whether the ID code included in the received response signal and the ID code stored in the memory 112 are in the predetermined correspondence relation (for example, agreement). If the check result is OK, the CPU 111 executes step S231. If the check result is NG even when all the frequency information was transmitted to the portable device 200 (even when all the communication frequencies usable by the portable device 200 were designated), the CPU 111 finishes the processing.

At step S231, the CPU 111 stores in the memory 112 (storing section) the communication frequency of the response signal, which the portable device 200 transmitted and resulted in the checkup OK, that is, the communication frequency (frequency information) designated to the portable device 200. Storing the communication frequency is for using it as the communication frequency as long as the radio wave environment, in which the vehicle and the portable device 200 operated and the check resulted in OK, does not change.

At step S232, the CPU 111 stores in the memory 112 (location storing section) the present location of the vehicle, which is detected by the location detection device, by coordinating the present location with the communication frequency. When the check result is OK, the CPU 111 stores the location, at which the check resulted in successful checkup, in the memory 112 (location storing section) in association with the communication frequency.

The radio wave environment, in which the vehicle and the portable device 200 are located, generally varies depending on locations. It is therefore likely that the place, at which the checkup was performed successfully, will not have changes in the radio wave environment even when the next and subsequent checkups are performed there. Therefore, it is highly possible that the checkup will be performed successfully there. According to the present embodiment, a change in the radio wave environment is estimated (estimation section) based on whether the checkup was performed successfully previously at the same place.

The processing operation of the in-vehicle device control system according to the present embodiment shown in FIG. 11 will be described next.

At step S210, similarly to step S10 in FIG. 2, the CPU 111 checks whether the sensor detection is present. If the check result indicates the sensor detection, step S211 is executed. If the check result indicates no sensor detection, the CPU 111 repeats the checkup of step S210.

At step S211, the CPU 111 checks whether the communication frequency (communication information), which is to be designated to the portable device 200, is stored in the memory 112. That is, it is checked whether the communication frequency, by which the check resulted in the checkup OK in the storing processing, is stored in the memory 112. That is, it is checked whether the communication frequency, which is less susceptible to communication impeding factors such as jamming radio noises, is stored in the memory 112. If the check result indicates absence of stored frequency, step S212 is executed. If the check result indicates presence of the stored frequency, step S215 is executed.

At step S212, similarly to step S11 in FIG. 2, the CPU 111 (checkup section) performs the exterior checkup by varying the frequency to check whether the portable device 200 is located outside the vehicle compartment.

At step S213, similarly to step S211, the CPU 111 performs whether the communication frequency (communication information), which is to be designated to the portable device 200, is stored in the memory 112. If the check result indicates absence of the stored frequency, step S214 is executed. If the check result indicates presence of the stored frequency, step S218 is executed.

At step S214, similarly to step S15 in FIG. 2, the CPU 111 (checkup section) performs the interior checkup by varying the frequency to check whether the portable device 200 is present in the vehicle compartment.

At step S215, the CPU 111 checks the present location of the vehicle based on whether the vehicle location (present location) detected by the location detection device is the same location as the location, which is stored in the memory 112 in coordination with the communication frequency.

If the CPU 111 determines at step S216 that the present location and the location stored in the memory 112 are the same, step S217 is executed. If it is determined that the present location and the stored location are different, step S212 is executed.

At step S217, the CPU 111 (checkup section) performs the exterior checkup by the fixed frequency to check whether the portable device 200 is located outside the vehicle compartment. This is for performing the exterior checkup (frequency setting section) by designating the communication frequency (frequency information), which is stored in the memory 112 in the storing processing (step S231 in FIG. 12). This communication frequency, which is designated to the portable device 200, is the communication frequency, by which the checkup resulted in OK at the present location. This communication frequency is less susceptible to the communication impeding factors such as jamming radio waves.

Figure 12:
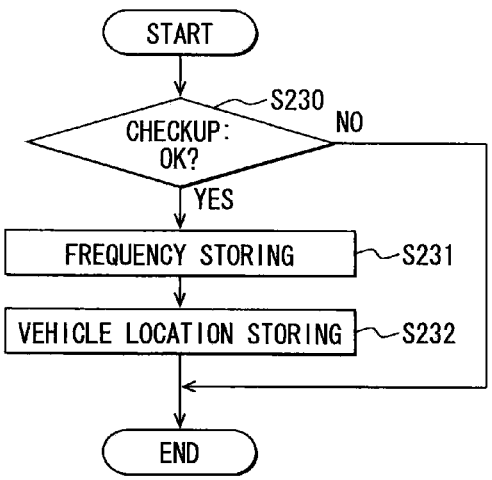
FIG. 12 is a flowchart showing frequency storing processing of the in-vehicle device control system according to the third embodiment of the present invention.

Accordingly, the CPU 111 transmits to the portable device 200 the request signal including the frequency information, which is stored in the memory 112 at step S231 in FIG. 12 and indicates the communication frequency to be designated to the portable device 200. When the portable device 200 transmits the response signal in response to the request signal, the portable device 200 transmits the response signal by the communication frequency designated by the vehicle-side unit 100.

At step S218, the CPU 111 (checkup section) performs the interior checkup by using the fixed frequency to check whether the portable device 200 is inside the vehicle compartment. This processing (frequency setting section) is for performing the interior checkup by designating the communication frequency (frequency information), which is stored in the memory 112 in the storing processing (step S231 in FIG. 12), to the portable device 200. This communication frequency designated to the portable device 200 is the communication frequency, by which the checkup OK is produced once at the present location. That is, this communication frequency is less susceptible to influence of factors such as jamming radio noises, which will impede the radio communication.

Accordingly, the CPU 111 transmits to the portable device 200 the request signal including the frequency information, which is stored in the memory 112 at step S231 in FIG. 12 and indicates the communication frequency designated to the portable device 200. When the portable device 200 transmits the response signal in response to the request signal, the portable device 200 transmits the response signal by the communication frequency designated by the vehicle-side unit 100.

Steps S219 to S222 are the same as steps S17, S18, S20 and S21 and hence the same description is not repeated.

According to the present embodiment, a change in the radio wave environment is estimated (estimation section) based on whether the place, at which the checkup is performed, is the same place as the place, at which the checkup was performed successfully previously. By thus storing the location of the vehicle and the communication frequency when the checkup was performed successfully, such a communication frequency can be selected as a communication frequency, which will be less influenced by factors such as jamming radio waves, for the portable device 200 in case of performing a checkup again at the same place, where the checkup was performed successfully once.

That is, in case that a checkup is performed at the same place (the radio wave environment is estimated as being not changing), at which the checkup was performed successfully, the communication frequency, which is stored in the memory when the checkup was performed successfully, is fixed as the communication frequency, which is to be designated to the portable device 200. Thus, the communication frequency (communication frequency used at the time of successful checkup), which is less susceptible to factors such as jamming radio waves, can be selected. As a result, it is not necessary to switch the communication frequency each time the checkup is performed and the degradation of the response characteristic is suppressed.

First Modified Example

Figure 13:
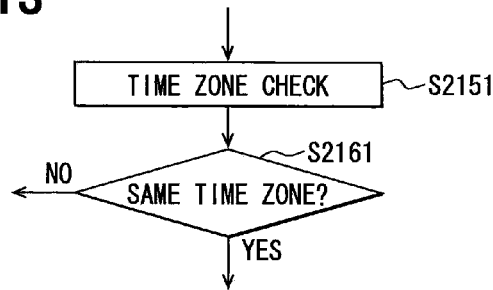
FIG. 13 is a flowchart showing a processing operation of a modified example of the third embodiment of the present invention.
Figure 14:
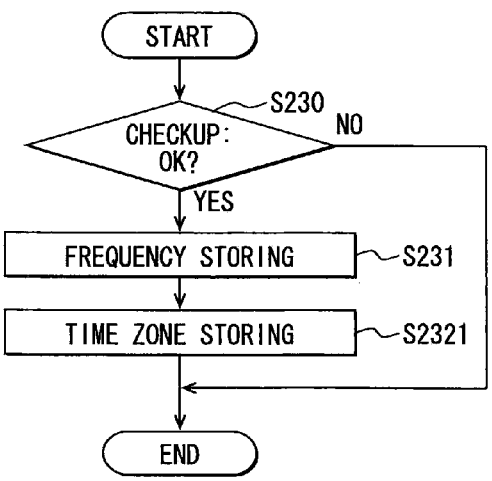
FIG. 14 is a flowchart showing frequency storing processing of the modified example of the third embodiment of the present invention.

The radio wave environment, in which the vehicle and the portable device 200 are located, may sometimes change depending on a time zone (for example, nighttime or daytime). As a first modified example of the third embodiment, it is possible to estimate a change in the radio wave environment, in which the vehicle and the portable device 200 is located, from the time of successful checkup based on the time zone, in which the checkup is performed as shown in FIGS. 13 and 14. The vehicle-side unit 100 according to the present embodiment is assumed to have a time detection device, which detects time.

First, the storing processing of the communication frequency in the first modified example shown in FIG. 14 will be described.

Similarly to the third embodiment (FIG. 12), when the check result at step S230 is OK, the CPU 111 stores in the memory 112 (storing section) the communication frequency of the response signal, which the portable device 200 transmitted and resulted in the checkup OK at step S231, that is, the communication frequency (frequency information) designated to the portable device 200.

Storing the communication frequency is for using it as the communication frequency as long as the radio wave environment, in which the vehicle and the portable device 200 are located and the checkup resulted in OK, does not change.

At step S2321, the CPU 111 detects the present time by the time detection device and stores in the memory 112 (time zone storing section) the time zone including the detected time by coordination with the communication frequency. That is, the CPU 111 stores in the memory 112 (time zone storing section) the time zone, at which the checkup was performed successfully, in association with the communication frequency used at that time.

The radio wave environment, in which the vehicle and the portable device 200 are located, generally varies depending on time zones (for example, daytime and nighttime). For example, a neon tube is activated mostly only at night and will possibly influence adversely to the radio wave environment. Therefore, at a place where a neon tube is present at a nearby location, the radio wave environment will possibly vary between daytime and nighttime even at the same place. It is therefore likely that the time zone, in which the checkup was performed successfully once, will not have changes in the radio wave environment even when the next and subsequent checkups are performed in the similar time zone. Therefore, it is highly possible that the checkup will be performed successfully. According to the present embodiment, a change in the radio wave environment is estimated (estimation section) based on whether the time zone of performing the checkup is the same time zone, in which the checkup was performed successfully previously.

The processing operation of the in-vehicle device control system according to the first modified example shown in FIG. 13 will be described next. In FIG. 13, only a part, which is different from the third embodiment (FIG. 11), is shown. If the check result at step S211 in FIG. 11 indicates that the communication frequency (frequency information) to be designated to the portable device 200 is stored in the memory 112, step S215 is executed. That is, it is checked whether the communication frequency, by which the checkup result became OK, is stored in the memory 112 in the storing processing. More specifically, it is checked whether the communication frequency, which is less influenced adversely by the factors such as jamming radio waves, is stored in the memory 112.

Figure 11:
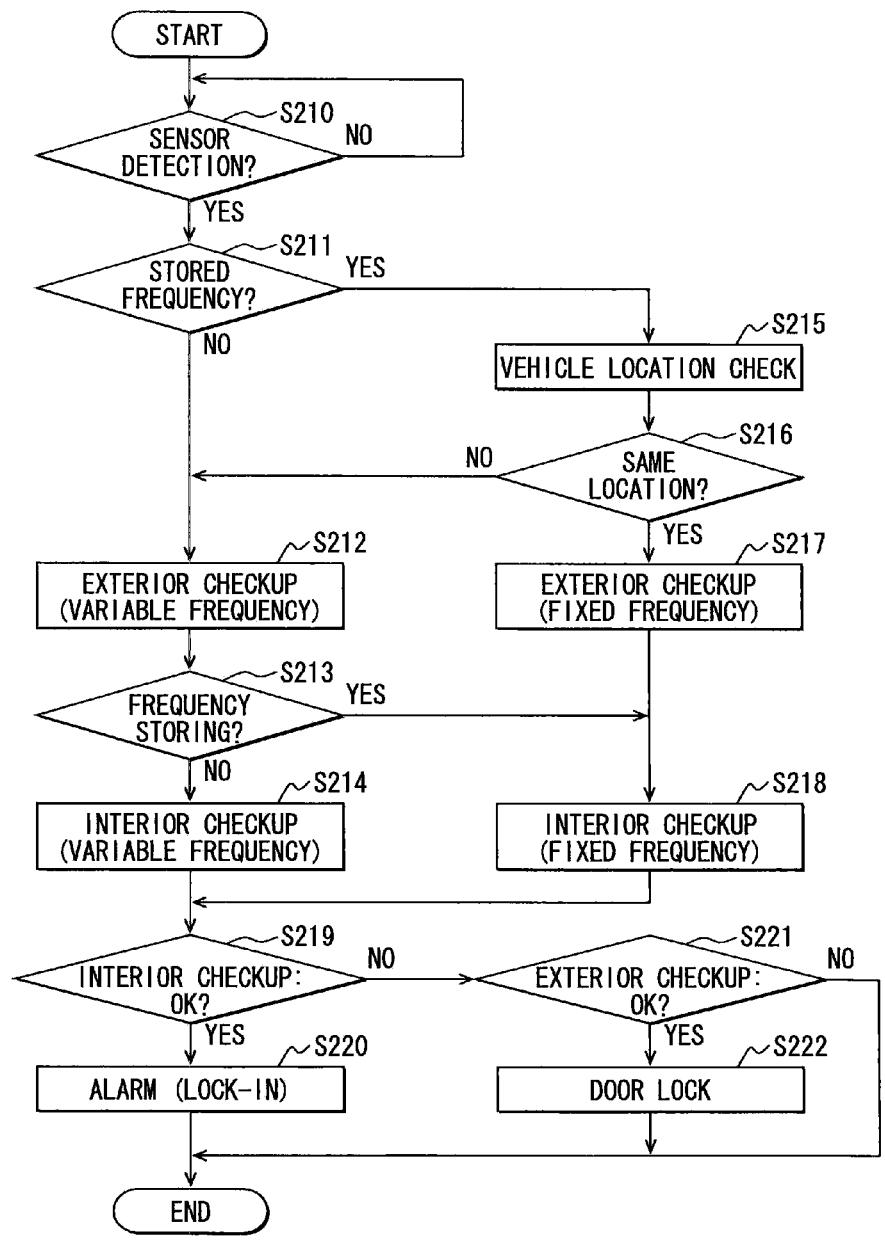
FIG. 11 is a flowchart showing a processing operation of an in-vehicle device control system according to a third embodiment of the present invention.

At step S2151, the CPU 111 detects present time by the time detection device in place of step S215 in FIG. 11. The CPU 111 then performs a time zone check to check whether a time zone including the detected time is the same time zone coordinated with the communication frequency stored in the memory 112.

The CPU 111 executes step S2161 in place of step S216 shown in FIG. 11. If the CPU 111 determines at step S2161 that the present time zone and the time zone stored in the memory 112 are the same, the CPU 111 executes step S217 shown in FIG. 11. If the time zones are not the same, the CPU 111 executes step S212 shown in FIG. 11

According to the present embodiment, a change in the radio wave environment is estimated (estimation section) based on whether the time zone, in which the checkup is performed, is the same time zone as the time zone, in which the checkup was performed successfully previously. By thus storing the time zone and the communication frequency when the checkup was performed successfully, such a communication frequency can be selected as a communication frequency, which will be less influenced by factors such as jamming radio waves, for the portable device 200 in case of performing a checkup again at the same time zone, in which the checkup was performed successfully once.

That is, in case that a checkup is performed in the same time zone (the radio wave environment is estimated as being not changing), in which the checkup was performed successfully, the communication frequency, which is stored in the memory when the checkup was performed successfully, is fixed as the communication frequency, which is to be designated to the portable device 200. Thus, the communication frequency (communication frequency used at the time of successful checkup), which is less susceptible to factors such as jamming radio waves, can be selected. As a result, it is not necessary to switch the communication frequency each time the checkup is performed and the degradation of the response characteristic is suppressed.

Fourth Embodiment

Figure 15:
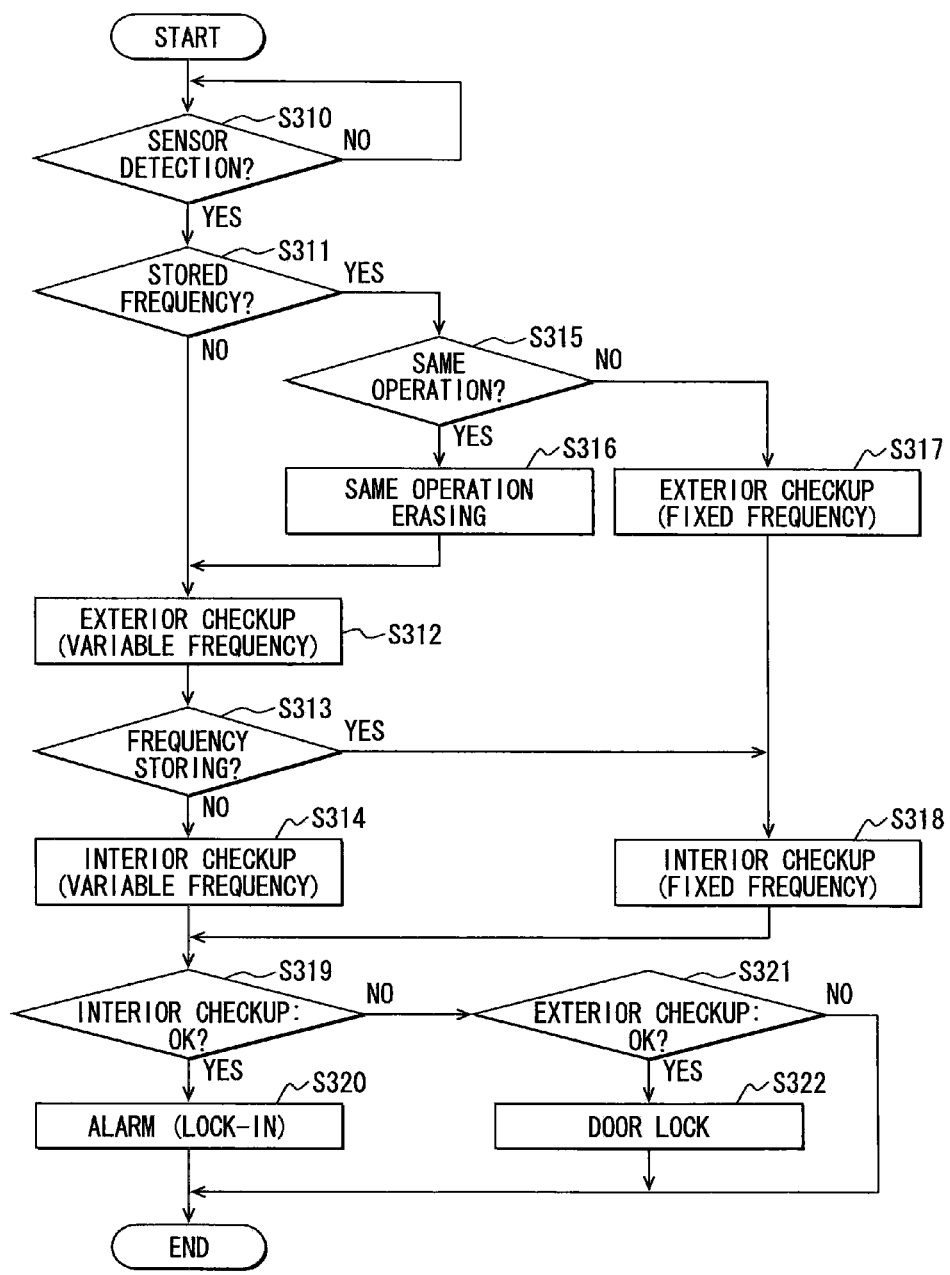
FIG. 15 is a flowchart showing a processing operation of an in-vehicle device control system according to a fourth embodiment of the present invention.

Next, a fourth embodiment will be described with reference to FIGS. 15 and 16.

The same configuration as the second and third embodiments will not be described. The present embodiment is different from the second and third embodiments in that the communication frequency, which is to be designated to the portable device 200, is released from being fixed. Further, the vehicle-side unit 100 according to the present embodiment is provided with a timer.

First, storing processing and erasing processing of an operation history in the in-vehicle device control system according to the present embodiment is described with reference to FIG. 16.

At step S330, the CPU 111 checks whether a smart operation was made. That is, according to the present embodiment, the CPU 111 checks whether the door lock sensor 140 was operated based on the signal from the door lock sensor 140. If it is determined that the door lock sensor 140 was operated as the smart operation, step S331 is executed. If it is determined that the door lock sensor 140 was not operated, that is, the smart operation is not made, step S330 is repeated.

At step S331, the CPU 111 checks whether the operation history is stored in the memory 112. If it is determined that the operation history is stored, step S334 is executed. If it is determined that the operation history is not stored, step S332 is executed.

At step S332, the CPU 111 clears a timer. At step S333, the CPU 111 stores the operation history in the memory 112.

At step S334, the CPU 111 checks whether a predetermined fixed time elapsed after the smart operation. If it is determined that the fixed time elapsed, step S335 is executed. If it is determined that the fixed time has not yet elapsed, step S337 is executed.

At step S335, the CPU 111 clears the timer. At step S336, the CPU 111 erases the operation history stored in the memory 112.

At step S337, the CPU 111 checks whether the user made the same operation (same smart operation). If it is determined that the same operation was made, step S338 is executed. If it is determined that the same operation was not made, step S340 is executed.

At step S338, the CPU 111 stores the same operation in the memory 112. At step S339, the CPU 111 erases the operation history stored in the memory 112.

At step S340, the CPU 111 clears the timer. At step S341, the CPU 111 erases the operation history stored in the memory 112.

The processing operation of the in-vehicle device control system according to the present embodiment shown in FIG. 15 will be described next.

At step S310, similarly to step S10 in FIG. 2, the CPU 111 checks whether the sensor detection is present. If the check result indicates the sensor detection, step S311 is executed. If the check result indicates no sensor detection, the CPU 111 repeats the checkup of step S310.

At step S311, the CPU 111 checks whether the communication frequency (communication information), which is to be designated to the portable device 200, is stored in the memory 112. That is, it is checked whether the communication frequency, by which the checkup resulted in the checkup OK, is stored in the memory 112. That is, it is checked whether the communication frequency, which is less susceptible to communication impeding factors such as jamming radio noises, is stored in the memory 112. If the check result indicates absence of stored frequency, step S312 is executed. If the check result indicates presence of the stored frequency, step S315 is executed.

At step S312, similarly to step S11 in FIG. 2, the CPU 111 (checkup section) performs the exterior checkup by varying the frequency to check whether the portable device 200 is located outside the vehicle compartment.

At step S313, similarly to step S311, the CPU 111 checks whether the communication frequency (communication information), which is to be designated to the portable device 200, is stored in the memory 112. If the check result indicates absence of the stored frequency, step S314 is executed. If the check result indicates presence of the stored frequency, step S315 is executed.

At step S314, similarly to step S15 in FIG. 2, the CPU 111 (checkup section) performs the interior checkup by varying the frequency to check whether the portable device 200 is present in the vehicle compartment.

Figure 16:
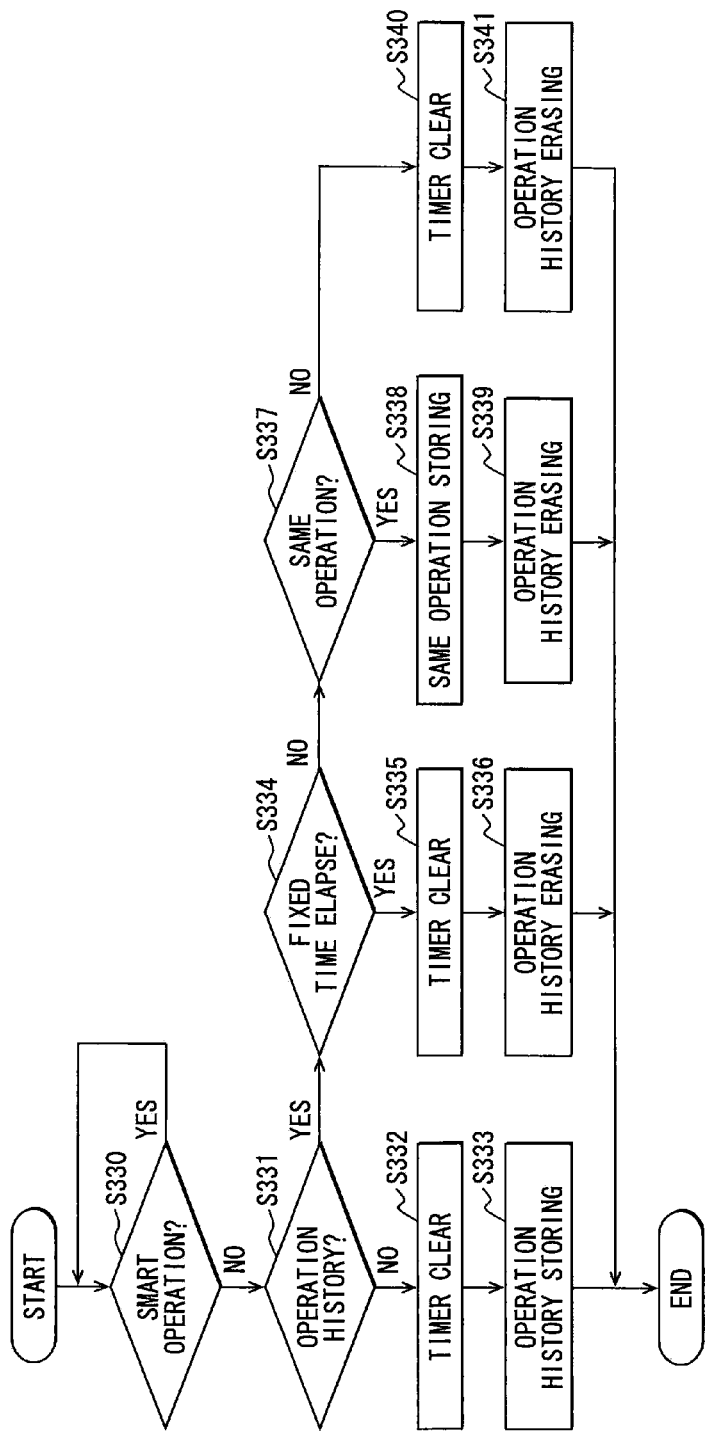
FIG. 16 is a flowchart showing storing processing and erasing processing of an operation history of the in-vehicle device control system according to the fourth embodiment of the present invention.

At step S315, the CPU 111 checks based on the processing shown in FIG. 16 whether the same operation is present. If it is determined that the same operation is present, step S316 is executed. If it is determined that the same operation is not present, step S317 is executed. At step S316, the CPU 111 erases the same operation stored in the memory 112.

At step S317, the CPU 111 (checkup section) performs the exterior checkup by the fixed frequency to check whether the portable device 200 is located outside the vehicle compartment. This is for performing the exterior checkup (frequency setting section) by designating the communication frequency (frequency information), which is stored in the memory 112 in the storing processing in the second embodiment and the third embodiment. This communication frequency, which is designated to the portable device 200, is the communication frequency that is less susceptible to the communication impeding factors such as jamming radio waves.

Accordingly, the CPU 111 transmits to the portable device 200 the request signal including the frequency information, which is stored in the memory 112 and indicates the communication frequency to be designated to the portable device 200. When the portable device 200 transmits the response signal in response to the request signal, the portable device 200 transmits the response signal by the communication frequency designated by the vehicle-side unit 100.

At step S318, the CPU 111 (checkup section) performs the interior checkup by using the fixed frequency to check whether the portable device 200 is inside the vehicle compartment. This processing (frequency setting section) is for performing the interior checkup by designating the communication frequency (frequency information), which is stored in the memory 112 in the storing processing in the second embodiment and the third embodiment, to the portable device 200. This communication frequency designated to the portable device 200 is the communication frequency, which is less susceptible to influence of factors such as jamming radio noises, which will impede the radio communication.

Accordingly, the CPU 111 transmits to the portable device 200 the request signal including the frequency information, which is stored in the memory 112. When the portable device 200 transmits the response signal in response to the request signal, the portable device 200 transmits the response signal by the communication frequency designated by the vehicle-side unit 100.

Steps S319 to S322 are the same as steps S17, S18, S20 and S21 and hence the same description is not repeated.

In case that the user performs the same operation within the fixed time, it is generally expected that the in-vehicle device, which is a controlled object, is not operating normally. By thus performing the foregoing processing, such a communication frequency (communication frequency, by which the checkup was performed successfully) can be selected as a communication frequency, which will be less influenced by factors such as jamming radio waves. As a result, it is not necessary to switch the communication frequency each time the checkup is performed and the degradation of the response characteristic is suppressed. However, when it is likely that the in-vehicle device, which is the controlled object, is not operating normally, the communication frequency to be designated can be released from being fixed.

In the checkup at step S337, not only a single same operation but also a succession of the same operation may be checked. That is, in case that the user operation is the same operation but not in succession, it is possible to not release the communication frequency to be designated from being fixed.

First Modified Example

As a first modified example of the fourth embodiment, it is possible to release the communication frequency to be designated from being fixed when the user repeats the same operation a fixed number of times. The first modified example is different from the fourth embodiment in that the fixing of the communication frequency may be allowed to be released when the same operation is repeated by the user. That is, the basic processing operation other than the frequency erasing processing in the in-vehicle device control system is the same as the fourth embodiment (FIG. 15).

The storing processing and the erasing processing of the operation history in the in-vehicle device control system according to the first modified example will be described with reference to FIG. 17.

At step S360, similarly to step S330 in FIG. 16, the CPU 111 checks whether the smart operation is made. If it is determined that the door lock sensor 140 was operated as the smart operation, step S361 is executed. If it is determined that the door lock sensor 140 was not operated, that is, the smart operation was not made S360 is repeated.

At step S361, similarly to step S331 in FIG. 16, the CPU 111 checks whether the operation history is stored in the memory 112. If it is determined that the operation history is stored, step S364 is executed. If it is determined that the operation history is not stored, step S362 is executed.

At step S362, the CPU 111 clears a count of operation stored in the memory 112. At step S363, similarly to step S333 in FIG. 16, the CPU 111 stores the operation history in the memory 112.

At step S364, similarly to step S337 in FIG. 16, the CPU 111 checks whether the same operation (same smart operation) was performed by the user, if it is determined at step S361 that the operation history is present. If it is determined that the same operation was made, step S365 is executed. If it is determined that the same operation was not present, step S369 is executed.

At step S365, the CPU 111 checks whether the user repeated the same operation a fixed number of times. If it is determined that the same operation was repeated the fixed number of times, step S366 is executed. If it is determined that the same operation was not repeated the fixed number of times, step S367 is executed. At step S366, the CPU 111 updates the count of operation stored in the memory 112.

At step S367, the CPU 111 stores the same operation in the memory 112. At step S368, the CPU 111 erases the operation history stored in the memory 112.

If it is determined at step S364 that the same operation is not performed, the CPU 111 clears the count of operation stored in the memory 112. At step S370, the CPU 111 erases the operation history stored in the memory 112.

Thus, it is checked whether the same operation was made by the user the fixed number of times.

In case that the user performs the same operation the fixed number of times, it is generally expected that the checkup was not performed successfully and the in-vehicle device, which is a controlled object, is not operating normally. By thus performing the foregoing processing, such a communication frequency (communication frequency, by which the checkup was performed successfully) can be selected as a communication frequency, which will be less influenced by factors such as jamming radio waves. As a result, it is not necessary to switch the communication frequency each time the checkup is performed and the degradation of the response characteristic is suppressed. However, when it is likely that the in-vehicle device, which is the controlled object, is not operating normally, the communication frequency to be designated can be released from being fixed.

In the checkup at step S364, not only the single same operation but also a succession of the same operation may be checked. That is, in case that the user operation is the same operation but not in succession, it is possible to not release the communication frequency to be designated from being fixed.

Second Modified Example

As a second modified example of the fourth embodiment, it is possible to release the communication frequency to be designated from being fixed, when the user repeats the same operation a fixed number of times within a fixed time. The second modified example is different from the fourth embodiment in that the fixing of the communication frequency may be allowed to be released when the same operation is repeated by the user the fixed number of times within the fixed time. That is, the basic processing operation other than the frequency erasing processing in the in-vehicle device control system is the same as the fourth embodiment (FIG. 15).

The storing processing and the erasing processing of the operation history in the in-vehicle device control system according to the second modified example will be described with reference to FIG. 18.

At step S380, similarly to step S330 in FIG. 16, the CPU 111 checks whether the smart operation was made. If it is determined that the door lock sensor 140 was operated as the smart operation, step S381 is executed. If it is determined that the door lock sensor 140 was not operated, that is, the smart operation was not made, step S380 is repeated.

At step S381, similarly to step S331 in FIG. 16, the CPU 111 checks whether the operation history is stored in the memory 112. If it is determined that the operation history is stored, step S385 is executed. If it is determined that the operation history is not stored, step S382 is executed.

At step S382, similarly to the step S332 in FIG. 16, the CPU 111 clears the timer. At step S383, the CPU 111 clears the count of the operation stored in the memory 112. At step S384, similarly to step S333 in FIG. 16, the CPU 111 stores the operation history in the memory 112.

At step S385, similarly to step S334 in FIG. 16, the CPU 111 checks whether the predetermined fixed time elapsed after the smart operation was made. If it is determined that the fixed time elapsed, step S386 is executed. If it is determined that the fixed time did not elapse, step S389 is executed.

At step S386, similarly to step S335 in FIG. 16, the CPU 111 clears the timer. At step S387, the CPU 111 clears the count of operation stored in the memory 112. At step S388, similarly to step S336, the CPU 111 erases the operation history stored in the memory 112.

Figure 17:
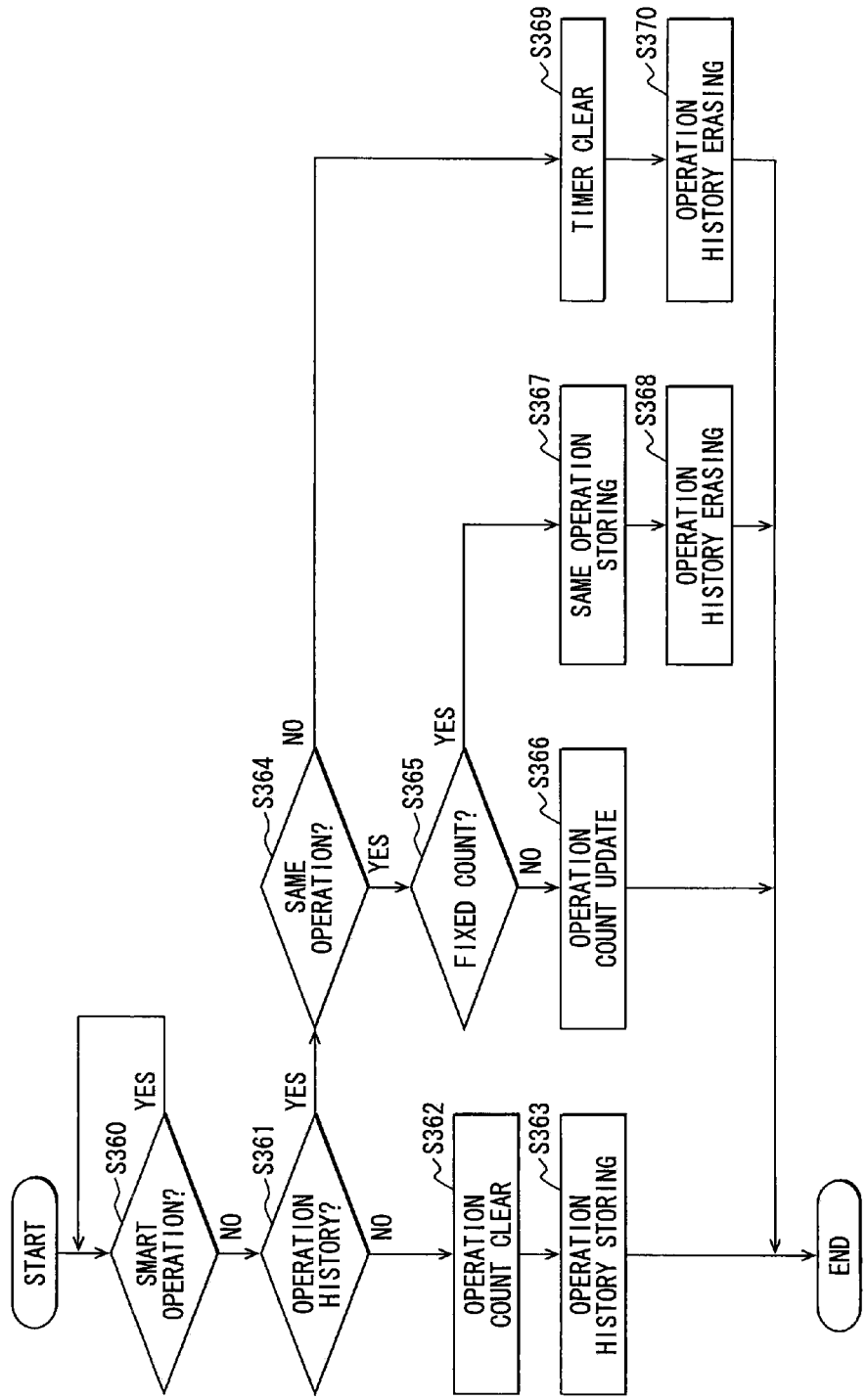
FIG. 17 is a flowchart showing storing processing and erasing processing of an operation history according to a first modified example of the fourth embodiment of the present invention.

At step S389, similarly to step S364 in FIG. 17, the CPU 111 checks whether the user made the same operation (same smart operation). If it is determined that the same operation was made, step S390 is executed. If it is determined that the same operation was not made, step S394 is executed.

At step S390, the CPU 111 checks whether the user repeated the same operation the fixed number of times. If it is determined that the same operation was repeated the fixed number of times, step S392 is executed. If it is determined that the same operation was not repeated the fixed number of times, step S391 is repeated. At step S391, the CPU 111 updates the count of operation stored in the memory 112.

At step S392, the CPU 111 stores the same operation in the memory 112. At step S393, the CPU 111 erases the operation history stored in the memory 112.

At step S394, the CPU 111 clears the timer. At step S395, the CPU 111 clears the count of operation stored in the memory 112. At step S396, the CPU 111 erases the operation history stored in the memory 112.

Thus, it is checked whether the same operation was made by the user the fixed number of times within the fixed time.

In case that the user performs the same operation a number of times in the fixed time, it is generally expected that the checkup was not performed successfully and the in-vehicle device, which is the controlled object, is not operating normally. By thus performing the foregoing processing, such a communication frequency (communication frequency, by which the checkup was performed successfully) can be selected as a communication frequency, which will be less influenced by factors such as jamming radio waves. As a result, it is not necessary to switch the communication frequency each time the checkup is performed and the degradation of the response characteristic is suppressed. However, when it is likely that the in-vehicle device, which is the controlled object, is not operating normally, the communication frequency to be designated can be released from being fixed.

In the checkup at step S389, not only the single same operation but also a succession of the same operation may be checked. That is, in case that the user operation is the same operation but not in succession, it is possible to not release the communication frequency to be designated from being fixed.

The invention claimed is:

1. An in-vehicle device control system comprising:
a portable device; and
a vehicle-side unit mounted on a vehicle for performing a checkup about the portable device by mutual communication using radio waves, in which the vehicle-side unit transmits a request signal and the portable device returns a response signal in response to the request signal of the vehicle-side unit, thereby to control an in-vehicle device based on a checkup result, the vehicle-side unit switching a communication frequency to perform the mutual communication and the checkup again when the checkup result indicates an unsuccessful checkup,
wherein the portable device includes:
a portable device communication section for receiving the request signal transmitted from the vehicle-side unit and returning the response signal as the mutual communication with the vehicle-side unit, the response signal including an ID code and transmitted at a communication frequency designated by the vehicle-side unit,
wherein the vehicle-side unit includes:
a detection section for detecting an operation of a user made by the user for controlling the in-vehicle device, by which the checkup is started;
a frequency setting section for setting the communication frequency to be designated to the portable device;
a vehicle-side communication section for transmitting the request signal to the portable device and receiving the response signal as the mutual communication with the portable device, the vehicle-side communication section transmitting to the portable device frequency information indicating the communication frequency set by the frequency setting section;
a checkup section for checking the ID code and a registration code pre-registered, the ID code being included in the response signal transmitted from the portable device and received by the vehicle-side communication section;
a storing section for storing the communication frequency, which is used when the checkup section indicates the check result as a successful checkup; and
a reset section, wherein the checkup section is configured to perform, for each operation detected by the detection section, a first checkup and a second checkup, the first checkup checks whether the portable device is outside a vehicle and a second checkup checks whether the portable device is inside the vehicle;
the frequency setting section is configured to switchover the communication frequency to be designated to the portable device when the check result of each of the first checkup and the second checkup is indicated the unsuccessful checkup by the checkup section,
the frequency setting section is configured to store the communication frequency when the first checkup is indicated the successful checkup by the checkup section,
the frequency setting section is configured to set the communication frequency, which is stored in the storing section, as the communication frequency to be used in the second checkup performed subsequent to the successful first checkup, and
the reset section resets a stored content of the storing section each time the second checkup is successful in response to a given operation detected by the detection section, the stored content corresponding to the communication frequency stored as a result of the first checkup provided as the successful checkup and used for the second checkup.

2. The in-vehicle device control system of claim 1, wherein the checkup section determines a given checkup as the successful checkup when the ID code corresponds with the registration code and determines the given checkup as the unsuccessful checkup when the ID code does not correspond with the registration code.

3. The in-vehicle device control system of claim 1 wherein the detection section detects a door lock operation as the given operation of the user.

4. An in-vehicle device control system comprising:
a portable device; and
a vehicle-side unit mounted on a vehicle for performing a checkup about the portable device by mutual communication using radio waves, in which the vehicle-side unit transmits a request signal and the portable device returns a response signal in response to the request signal of the vehicle-side unit, thereby to control an in-vehicle device based on a checkup result, the vehicle-side unit switching a communication frequency to perform the mutual communication and the checkup again when the checkup result indicates as an unsuccessful checkup,
wherein the portable device includes:
a portable device communication section for receiving the request signal transmitted from the vehicle-side unit and returning the response signal as the mutual communication with the vehicle-side unit, the response signal including an ID code and transmitted at the communication frequency designated by the vehicle-side unit,
wherein the vehicle-side unit includes:
a detection section for detecting an operation of a user made by the user for controlling the in-vehicle device, by which the checkup is started;
a frequency setting section for setting the communication frequency to be designated to the portable device;
a vehicle-side communication section for transmitting the request signal to the portable device and receiving the response signal as the mutual communication with the portable device, the vehicle-side communication section transmitting to the portable device the request signal comprising frequency information indicating the communication frequency set by the frequency setting section;
a checkup section for checking the ID code and a registration code pre-registered, the ID code being included in the response signal transmitted from the portable device and received by the vehicle-side communication section;
a storing section for storing the communication frequency, which is used when the checkup section indicates the check result as a successful checkup;
an estimation section for estimating a change in a radio wave environment, in which the vehicle and the portable device are located, after the successful checkup by the checkup section; and
an erasing section, wherein:
the checkup section is configured to perform, for each operation detected by the detection section, a first checkup and a second checkup, the first checkup checks whether the portable device is outside the vehicle and the second checkup checks whether the portable device is inside the vehicle;
the frequency setting section is configured to switchover the communication frequency to be designated to the portable device when the checkup section indicates the checkup result of each of the first checkup and the second checkup as the unsuccessful checkup,
the frequency setting section is configured to fix the communication frequency for a present checkup to the communication frequency stored in the storing section in response to the successful checkup in a previous checkup corresponding to a previous operation of the user, when no change in the radio wave environment is estimated relative to the previous operation of the user,
the frequency setting section sets a communication frequency different from the communication frequency stored based on the successful checkup when the change in the radio wave environment is estimated, and
the erasing section erases a stored content of the storing section when the change in the radio wave environment is estimated by the estimated section, the stored content corresponding to the communication frequency stored as a result of the successful checkup performed by the checkup section in the previous checkup.

5. The in-vehicle device control system according to claim 4, wherein:
the vehicle-side unit includes a timer section for measuring time; and
the estimation section estimates that no change is in the radio wave environment for a fixed time measured by the timer section after the successful checkup by the checkup section and estimates the change in the radio environment when the fixed time elapses after the successful checkup by the checkup section.

6. The in-vehicle device control system according to claim 4, wherein:
the vehicle-side unit includes a door-opening detection section for detecting door-opening of the vehicle; and
the estimation section estimates that no change is in the radio wave environment when the door-opening detection section does not detect the door-opening after the successful checkup by the checkup section and estimates the change in the radio wave environment when the door-opening detection section detects the door-opening after the successful checkup by the checkup section.

7. The in-vehicle device control system according to claim 4, wherein:
the vehicle-side unit includes a power condition detection section for detecting a power condition of the vehicle; and
the estimation section estimates that no change is in the radio wave environment when the power condition detection section does not detect turning-on of an IG or an ACC of the vehicle after the successful checkup by the checkup section and estimates the change in the radio wave environment when the power condition detection section detects turning-on of the IG or the ACC of the vehicle after the successful checkup by the checkup section.

8. The in-vehicle device control system according to claim 4, wherein:
the vehicle-side unit includes a start detection section for detecting a start operation of an engine of the vehicle; and
the estimation section estimates that no change is in the radio wave environment when the start detection section does not detect the start operation of the engine after the successful checkup by the checkup section and estimates the change in the radio wave environment when the start detection section detects the start operation of the engine after the successful checkup by the checkup section.

9. The in-vehicle device control system according to claim 4, wherein:
the vehicle-side unit includes a vehicle travel speed detection section for detecting a travel speed of the vehicle; and
the estimation section estimates that no change is in the radio wave environment when the vehicle travel speed detection section does not detect the vehicle travel speed of the vehicle after the successful checkup by the checkup section and estimates the change in the radio wave environment when the vehicle travel speed detection section detects the vehicle travel speed of the vehicle after the successful checkup by the checkup section.

10. The in-vehicle device control system according to claim 4, wherein:
the vehicle-side unit includes a location detection section for detecting a location where the vehicle is located, and a location storing section for storing a location where the checkup section performed the successful checkup; and
the estimation section estimates that no change is in the radio wave environment when a current location of the vehicle is same as the location of the successful checkup by the checkup section and stored in the location storing section.

11. The in-vehicle device control system according to claim 4, wherein:
the vehicle-side unit includes a time detection section for detecting time, and a time zone storing section for storing a time zone of the successful checkup in case the checkup section performed the successful checkup; and
the estimation section estimates that no change is in the radio wave environment when the time of the successful checkup by the checkup section is stored in the time zone storing section.

12. The in-vehicle device control system according to claim 4, wherein:
the frequency setting section releases the communication frequency to be designated from being fixed, when the detection section detects a same operation by the user in a fixed time.

13. The in-vehicle device control system according to claim 12, wherein:
the frequency setting section releases the communication frequency to be designated from being fixed, when the detection section detects a series of same operation by the user in the fixed time.

14. The in-vehicle device control system according to claim 4, wherein:
the frequency setting section releases the communication frequency to be designated from being fixed, when the detection section detects the same operation by the user a fixed number of times.

15. The in-vehicle device control system according to claim 14, wherein:
the frequency setting section releases the communication frequency to be designated from being fixed, when the detection section detects the series of same operation by the user a fixed number of times.

16. The in-vehicle device control system according to claim 4, wherein:
the frequency setting section releases the communication frequency to be designated from being fixed, when the detection section detects the same operation by the user a fixed number of times in a fixed time.

17. The in-vehicle device control system according to claim 16, wherein:
the frequency setting section releases the communication frequency to be designated from being fixed, when the detection section detects the series of same operation by the user a fixed number of times in a fixed time.

18. The in-vehicle device control system of claim 4 wherein the detection section detects a door lock operation as the operation of the user.

19. The in-vehicle device control system of claim 18 wherein the estimation section estimates the change in the radio wave environment between two door lock operations made when the user leaves the vehicle in a first occurrence and when the user leaves the vehicle is a second occurrence subsequent to the first occurrence.

* * * * *